United States Patent
Perschke

(10) Patent No.: US 12,435,598 B2
(45) Date of Patent: Oct. 7, 2025

(54) VALVES FOR WELL SYSTEMS AND METHODS OF OPERATING SAME

(71) Applicant: Heshka Oil, Conroe, TX (US)

(72) Inventor: Malcolm Perschke, Conroe, TX (US)

(73) Assignee: TEXAS HIGHLAND HOLDINGS LLC, Conroe, TX (US)

( * ) Notice: Subject to any disclaimer, the term of this patent is extended or adjusted under 35 U.S.C. 154(b) by 0 days.

(21) Appl. No.: 18/533,864

(22) Filed: Dec. 8, 2023

(65) Prior Publication Data

US 2025/0075591 A1    Mar. 6, 2025

Related U.S. Application Data

(63) Continuation-in-part of application No. 18/457,226, filed on Aug. 28, 2023.

(51) Int. Cl.
    *E21B 34/02*    (2006.01)

(52) U.S. Cl.
    CPC .................... *E21B 34/02* (2013.01)

(58) Field of Classification Search
    CPC ..................................... E21B 34/02
    USPC ........................................ 166/378
    See application file for complete search history.

(56) References Cited

U.S. PATENT DOCUMENTS

| | | | |
|---|---|---|---|
| 334,690 A | 1/1886 | Craik | |
| 3,586,106 A * | 6/1971 | Conrad | E21B 33/12955 166/120 |
| 3,624,979 A | 12/1971 | Przybylski | |
| 3,766,941 A * | 10/1973 | Davis, Jr. | F16K 24/04 137/493.4 |
| 3,912,008 A * | 10/1975 | Crowe | E21B 34/10 166/212 |
| 4,287,912 A * | 9/1981 | Hewett | F16K 15/044 137/523 |
| 5,875,851 A | 3/1999 | Vick, Jr. et al. | |
| 6,199,628 B1 | 3/2001 | Beck et al. | |

(Continued)

FOREIGN PATENT DOCUMENTS

WO    WO 2006/061645    6/2006

OTHER PUBLICATIONS https://www.heshkaoil.com/products/type-h-back-pressure-valves/, website pages, 4 pages, printed out on Aug. 15, 2023 (origination date unkown).

(Continued)

*Primary Examiner* — Tara Schimpf
*Assistant Examiner* — Patrick F Lambe
(74) *Attorney, Agent, or Firm* — NIXON & VANDERHYE P.C.

(57) ABSTRACT

A valve for use in a hanger body of a well system comprises a valve body configured for insertion into the hanger body in an axial direction and comprising an exterior surface. A first segment of the exterior surface is configured with a helical thread to engage a counter-threaded portion of a tubing hanger body. A second segment of the exterior surface is configured as an essentially circumferential groove to accommodate an essentially toroidal sealing member. The valve body further comprises at least one stop member configured to control an extent of the insertion of the valve body into the hanger body and thereby preclude threads of the counter-threaded portion of a tubing hanger body from affecting the essentially toroidal sealing member.

27 Claims, 18 Drawing Sheets

(56) References Cited

U.S. PATENT DOCUMENTS

| | | | |
|---|---|---|---|
| 6,719,059 B2 | 4/2004 | Dezen et al. | |
| 7,051,810 B2 | 5/2006 | Clemens et al. | |
| 7,121,344 B2 | 10/2006 | Fenton et al. | |
| 7,195,225 B1* | 3/2007 | Holliday | E21B 33/047 251/313 |
| 8,028,752 B2 | 10/2011 | Richards | |
| 8,555,986 B2 | 10/2013 | Clemens et al. | |
| 9,382,777 B2 | 7/2016 | Pettersen et al. | |
| 10,082,005 B2 | 9/2018 | Salomonsen et al. | |
| 10,087,693 B2 | 10/2018 | Bye | |
| 11,530,592 B2 | 12/2022 | Perschke | |
| 2009/0194291 A1 | 8/2009 | Fesi et al. | |
| 2010/0200217 A1* | 8/2010 | Gette | E21B 33/04 166/208 |
| 2012/0024521 A1 | 2/2012 | Villa | |
| 2014/0116720 A1* | 5/2014 | He | E21B 21/10 166/373 |
| 2016/0258232 A1 | 9/2016 | Harper | |
| 2018/0080291 A1 | 3/2018 | Sipos | |
| 2019/0178412 A1* | 6/2019 | Leon | F16K 37/0008 |
| 2020/0040687 A1 | 2/2020 | Kleppa | |
| 2020/0248523 A1* | 8/2020 | Craycraft | E21B 33/04 |

OTHER PUBLICATIONS

U.S. Office Action dated Oct. 1, 2024 issued in U.S. Appl. No. 18/457,226, 11 pp.

* cited by examiner

VALVES FOR WELL SYSTEMS AND METHODS OF OPERATING SAME

This application is a continuation-in-part patent application of U.S. patent application Ser. No. 18/457,226, filed Aug. 28, 2023, entitled "VALVES FOR WELL SYSTEMS AND METHODS OF OPERATING SAME", which is incorporated herein by reference in its entirety.

TECHNICAL FIELD

The technology relates to valves that may be employed in a well system, particularly valves that employ sealing elements which provide a seal between the valve and a tubing hanger, for example.

BACKGROUND

There is a need in the oilfield to be able to remove equipment such as a valve or a series of valves, collectively and/or more commonly known as a Wellhead Christmas Tree, from a wellhead for servicing purposes. A component known as a Back Pressure Valve (BPV) may be employed for such equipment removal while still maintaining pressure control of the production tubing. An example of a Back Pressure Valve (BPV) is shown in FIG. 1. See also https://www.heshkaoil.com/products/type-h-back-pressure-valves/.

Another reason for using a Back Pressure Valve may be to facilitate installation of a Blow-Out Preventer to the wellhead in preparation of working over a well. A feature of the Back Pressure Valve is that the Back Pressure Valve has flow through capability in the event that there is a need to kill the well. The design of the Back Pressure Valve with a spring-energized poppet enables the well kill.

There is a step in the process during the removal of the old Wellhead Christmas Tree and replacement with a new one that requires a different component to be utilized. When new/different equipment has been installed onto the wellhead there is a need to confirm the integrity of the new connection to hold pressure. To confirm the integrity of the new connection it is common in the industry to utilize what is known as a Two-Way Check Valve (TWCV). An example prior art Two-Way Check Valve (TWCV) is shown in FIG. 2. The disadvantage of running and installing a type of unit such as a Two-Way Check Valve relies on the operator's skill and feel as to when there is sufficient torque applied to the sealing element of the Two-Way Check Valve to provide a seal. Most especially this is critical in the running and setting of the two-way check valve.

The structure of the example prior art Back Pressure Valve (BPV) 120 shown in FIG. 1 and the structure of the example prior art Two-Way Check Valve 220 shown in FIG. 2 provide context for discussion of disadvantages of such prior art valves utilized in wellheads. In the landscape views of both FIG. 1 and FIG. 2, the top of the respective valves 120 and 220 is at left of the figures. Both the example prior art Back Pressure Valve (BPV) 120 and the example prior art Two-Way Check Valve 220 are briefly described below in simplified manner.

The example prior art Back Pressure Valve (BPV) 120 of FIG. 1 comprises a valve body 122. In a region of its greatest diameter the valve body 122 comprises external circumferential threads 124 which are configured to mate with a counter-threaded interior surface of a tubing hanger. A cavity 126 is defined in the interior of valve body 122. A spring-energized poppet 128 is situated in cavity 126. As shown in FIG. 4, valve body 122 may also comprise a channel 129 on its inner diameter. The channel 129 may comprise a machined slot in the BPV 120 that ensures a barrier free passage for fluid when it is being retrieved using the retrieval tool. For example, the channel 129 may be configured to facilitate pressure relief when the poppet 128 is displaced from its seat. FIG. 4 further shows a tapered surface leading to a through bore in which poppet 128 sits.

A seal 130 is provided in the region of the greatest diameter of valve body 122 but vertically above the external circumferential threads 124 when employed in a wellhead. The seal 130 is accommodated in a seal seating groove 132 which extends around a circumference of the valve body 122. The seal 130 is intended to form a seal between the valve body 122 of Back Pressure Valve (BPV) 120 and the tubing hanger into which the Back Pressure Valve (BPV) 120 is threadingly engaged.

The example prior art Two-Way Check Valve 220 of FIG. 2 similarly comprises a valve body 222 comprising external circumferential threads 224 and having cavity 226 defined in an interior of valve body 222, with poppet 228 being situated in cavity 226. A seal 230 is provided in the region of the greatest diameter of valve body 222 but upstream of the external circumferential threads 224. The seal 230 is accommodated in a seal seating groove 232 which extends around a circumference of the valve body 222. The seal 230 is intended to form a seal between the valve body 222 of Two-Way Check Valve 220 and the tubing hanger into which the Two-Way Check Valve 220 is threadingly engaged.

A problem with both the prior art Back Pressure Valve (BPV) and the prior art Two-Way Check Valve is that the external threads are designed and configured to break into the seal carrier grooves. The seal seating groove 132 is shown in FIG. 3 as comprising groove top pressure surface 134 and groove bottom pressure surface 136. As described with respect to FIG. 3, the "top" and "bottom" refer to vertical orientation of the valve in the wellhead, whereas with respect to FIG. 1 "top" and "bottom" without reference to any particular valve structure refer to orientation or location in the landscape figure. The interference or intrusion of the external thread 124 of Back Pressure Valve (BPV) 120 into the seal carrier groove 132 is illustrated in FIG. 1 and FIG. 3, for example, by a trough of the external circumferential thread 124 occurring in a region 138 of the groove bottom pressure surface 136, as shown in FIG. 3 and at the bottom of FIG. 1, in contrast to a crest of the external circumferential thread 124 occurring a right edge of the seal seating groove 132 as shown at the top of FIG. 1. As shown in more detail in FIG. 3, the trough of the external circumferential thread 124 occurring in the region 138 of the groove bottom pressure surface 136 of the seal seating groove 132 eats into or defrays the shoulder of the groove bottom pressure surface 136 of the seal seating groove 132. As a result of the right shoulder of seal seating groove 132 not extending to its potential full radial extent, upon application of pressure to the valve, e.g., by torquing the valve, the seal 130 is prone to deform and to spread or bulge axially, rather than to fully form the radial sealing engagement with the surrounding tubing hanger. Moreover, by not fully forming a seal at the groove bottom pressure surface 136, the seal 130 has a tendency to extrude and fail by reason, e.g., of greater pressure being applied to the top of the seal (BPV), at the portion of seal 130 near the groove top pressure surface 134. Essentially the same problematic situation occurs in the Two-Way Check Valve 220 of FIG. 2, for example, in which a trough of the external circumferential thread 224 occurs at the right edge of the seal seating groove 232 as shown at the top of FIG. 2. It is at the right edge at which the thread ends in the groove.

The deformation of sealing material into an adjacent threaded region in wellhead valves such as a Back Pressure Valve (BPV) and a Two-Way Check Valve reduces the area of lower pressure surface supporting the seal and prevents the seal from fully radially extruding, which may lead to failure of the seal. The lower or reduced lower pressure surface area is where the seal can extrude into trough 138 as there is nothing to prevent it doing so.

Another disadvantage of the prior art is that, if excessive torque is applied through the valves, the thread can start to cut into the seal rendering it useless. Since torque application is largely a matter of operator feel/sensitivity, application of excessive torque is not uncommon.

The technology disclosed herein seeks to mitigate or eliminate various disadvantages involved in the construction and use of prior art valves that employ seals, such as Back Pressure Valves and Two-Way Check Valves.

SUMMARY

In the example embodiments described herein concern valves for use in a hanger body of a well system. The valves may be, for example, a Back Pressure Valve (BPV) or a Two-Way Check Valve (TWCV). In a generic example embodiment and mode, the valve comprises a valve body configured for insertion into the hanger body in an axial direction and comprising an exterior surface. A first segment of the exterior surface is configured with a helical thread to engage a counter-threaded portion of a tubing hanger body. A second segment of the exterior surface is configured as an essentially circumferential groove to accommodate an essentially toroidal sealing member. The valve body further comprises at least one stop member configured to control an extent of the insertion of the valve body into the hanger body and thereby preclude threads of the counter-threaded portion of a tubing hanger body from affecting the essentially toroidal sealing member.

In some example embodiments and modes, the groove comprises essentially right angle shoulders at both intersections of the groove with the exterior surface. A third segment of the exterior surface, in the axial direction, is intermediate the first segment and the second segment. The third segment of the exterior surface comprises the at least one stop member which is configured to control an extent of the insertion of the valve body into the hanger body.

In some example embodiments and modes, the at least one stop member comprises a positive stop ring. At least a portion of the positive stop ring comprises an essentially smooth circumferential surface which is parallel to the axial direction. In an example implementation, a thread relief grove may be formed axially between the at least one stop member and the helical thread of the first segment.

In some example embodiments and modes, the third segment of the exterior surface comprises an essentially circumferential second groove and a split ring assembly. The split ring assembly comprises plural split ring segments which are configured for mating together and insertion into the second grove to form an essentially smooth circumferential surface which is parallel to the axial direction.

In some example embodiments and modes, the third segment of the exterior surface comprises plural discrete stop members which are circumferentially arranged on the valve body and configured to control the extent of the insertion of the valve body into the hanger body.

In other example embodiments and modes, the at least one stop member of the valve is situated at least partially in the seal seating groove which also serves to accommodate the seal. In such example embodiments and modes, the seal seating groove is preferably sufficiently long in the axial direction so that the stop member may be rooted, secured, or fit adjacent to or even form the groove bottom pressure surface, and also to provide room in the seal seating groove for the seal and reasonable expansion thereof. In an example implementation in which the stop member comprises plural discrete stop members which are circumferentially arranged on the valve body in the seal seating groove. In an alternate example implementation, the stop member may comprise a split ring assembly comprising plural split ring segments.

In still another of its example aspects the technology disclosed herein concerns a method of inserting a valve into a hanger body of a well system. In a basic example embodiment and mode, the method comprises axially inserting a valve into a hanger body of a well system and then rotating the valve to cause axial travel of the valve within the hanger body by engagement of the helical thread with a counter-threaded portion of the tubing hanger body until further axial travel is stopped by at least one stop member configured to control an extent of the insertion of the valve body into the hanger body and thereby preclude threads of the counter-threaded portion of a tubing hanger body from affecting the essentially toroidal sealing member.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
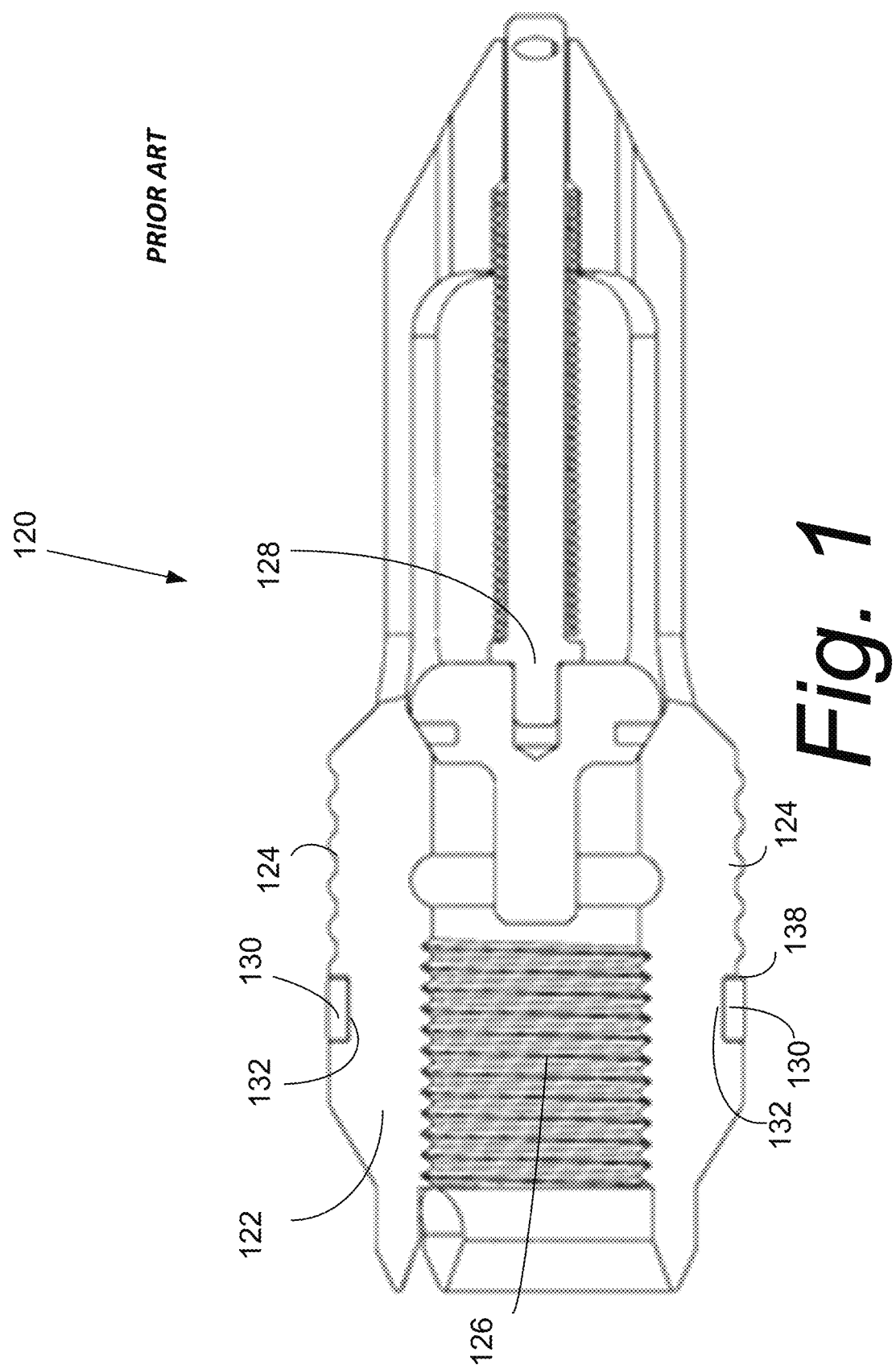
FIG. 1 is a cross sectional view of a prior art Back Pressure Valve (BPV) for plugging off a well.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The technology disclosed herein generally relates to valves for use in a well system. As used herein, "well system" encompasses any application where it is required to isolate the upper portions of a system from pressure generated below the system. Thus "well system" encompasses various applications and installations, such as wellheads, water loop applications, and geothermal applications, for example. Unless otherwise clear from the context, reference herein to "wellhead" may encompass well system. In some of its example aspects the technology disclosed herein may relate to back pressure valves and two-way check valves for well systems, for example, that may be employed for sealing off a well such as those in the oil and gas field to provide well control during secondary maintenance of equipment, such as Wellhead Trees or Blowout Preventers, for example. Further, in one of its example aspects the technology disclosed herein relates to providing a feature that ensures a positive indication that valves for use in a well system, such as back pressure valves and/or two-way check valve, are landed in a correct position within the tubing hanger during the installation process.

Figure 5:
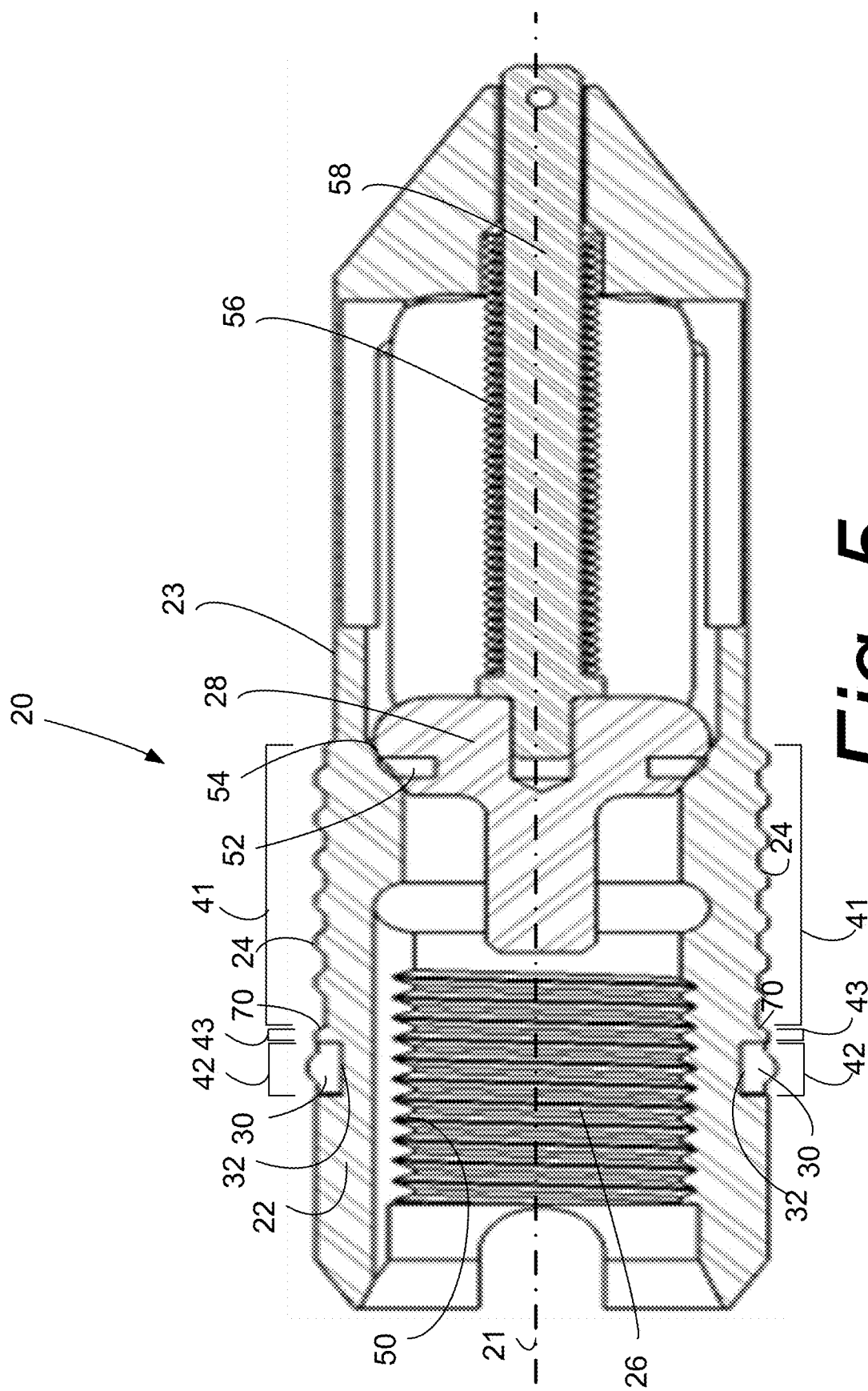
FIG. 5 is a cross sectional of an example Back Pressure Valve according to an example embodiment and mode.

FIG. 5 shows, in cross section, a valve 20 for use in a hanger body of a wellhead. The particular valve shown in FIG. 5 is a Back Pressure Valve (BPV), but it should be understood that sealing structure as described herein for valve 20 may also be employed in a Two-Way Check Valve. In an example embodiment and mode, valve 20 comprises valve body 22 that extends along valve body axis 21. The valve 20 is configured for insertion into a hanger body in the direction of body axis 21, e.g., in the axial direction. The valve body 22 is shown as comprising valve body exterior surface 23 and interior cavity 26. The interior cavity 26 is configured to accommodate a poppet 28.

The valve body exterior surface 23 is shown in FIG. 5 as comprising at least plural exterior surface segments, including exterior surface first segment 41, exterior surface second segment 42, and exterior surface third segment 43. The valve body exterior surface 23 extends beyond the segments 41, 42, and 43, in both upstream and downstream directions, e.g., to the left and right of segments 41, 42, and 43 in FIG. 5.

Figure 6A:
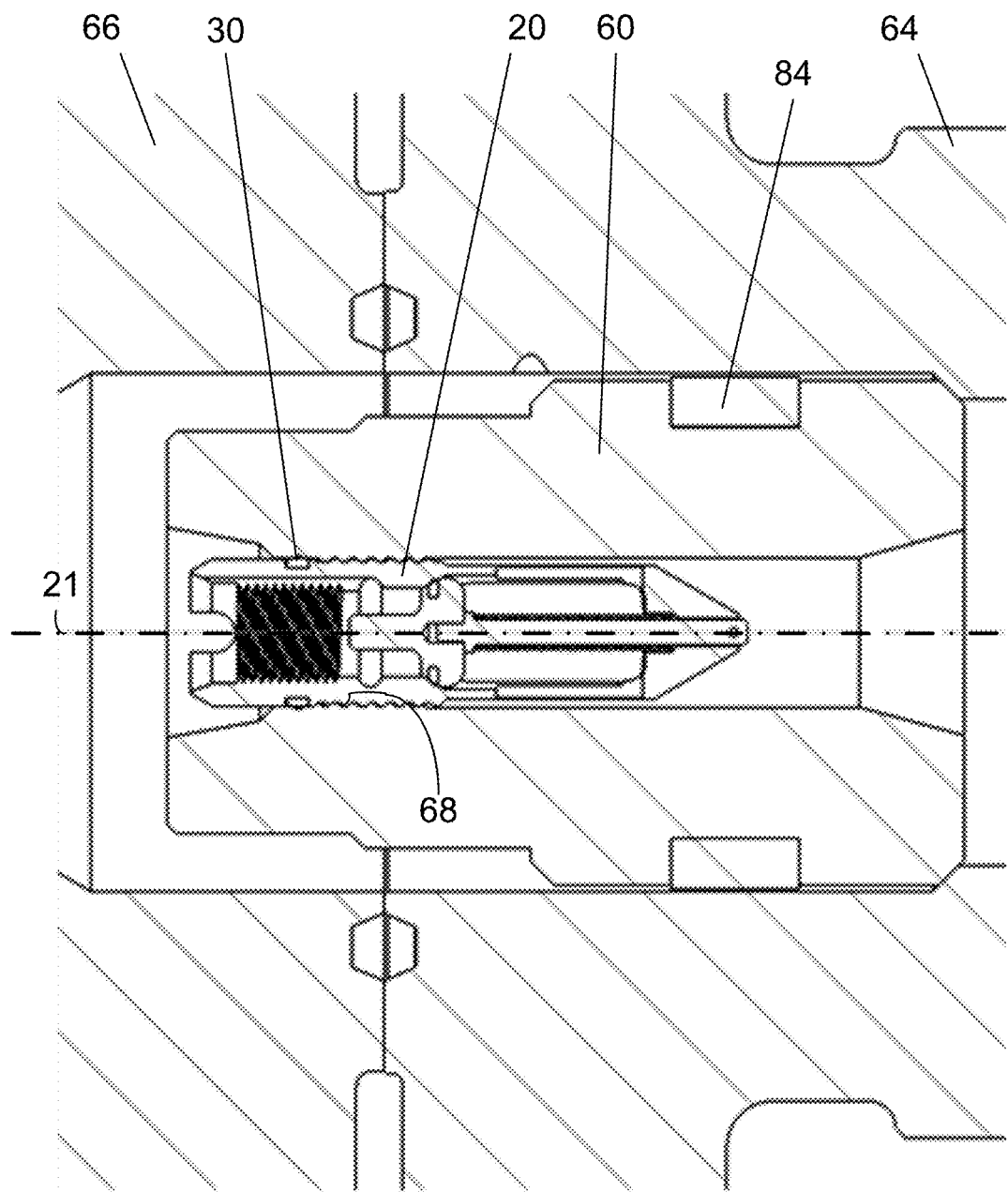
FIG. 6A is a cross sectional view showing the Back Pressure Valve of FIG. 4 installed in a wellhead tubing hanger.
Figure 6B:
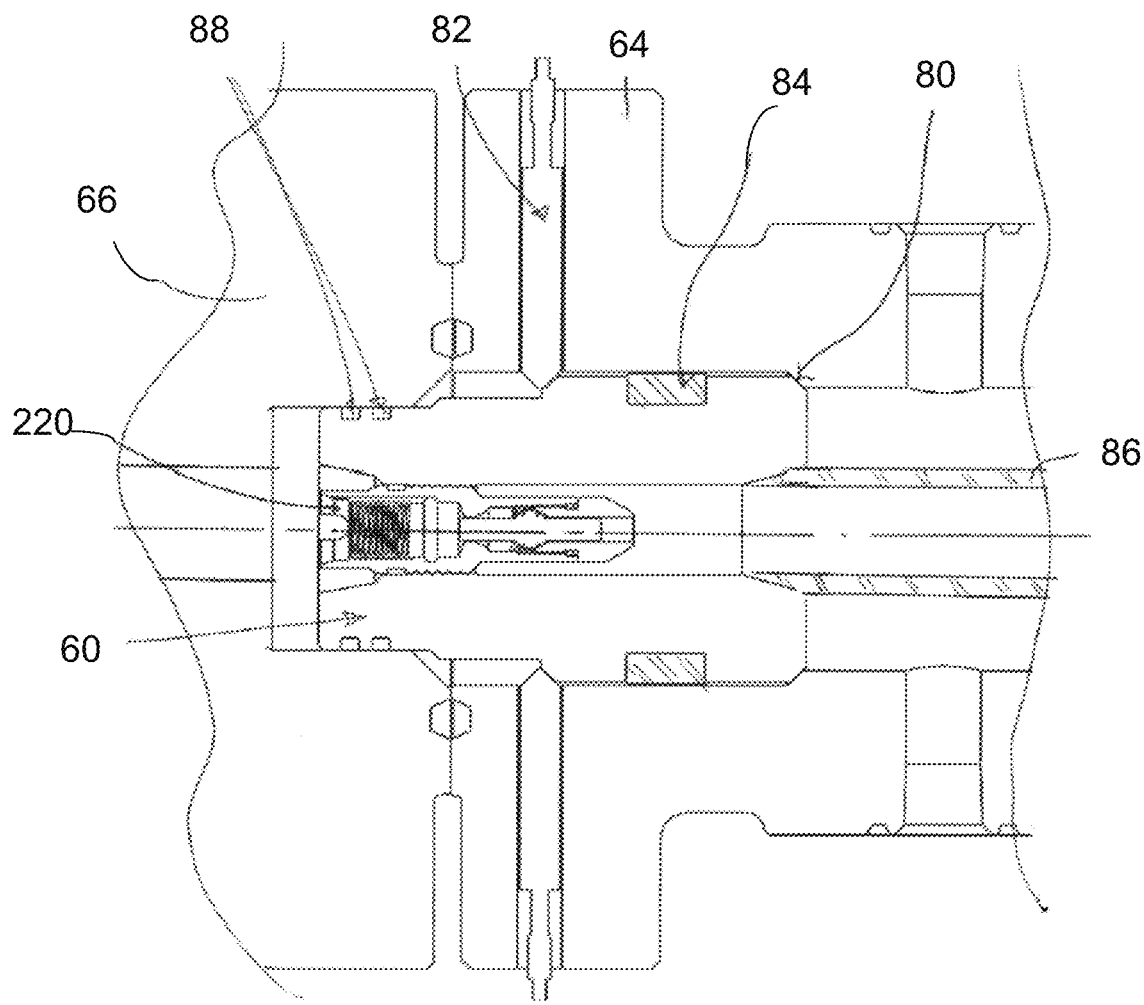
FIG. 6B is a cross sectional view showing a Two-Way Check Valve according to an example embodiment and mode installed in a wellhead tubing hanger.

The exterior surface first segment 41 is configured with an external helical thread 24 to engage a counter-threaded portion of the tubing hanger body, as shown with reference to FIG. 6A and FIG. 6B, for example.

The exterior surface second segment 42 is configured as a circumferential groove to accommodate an essentially toroidal-shaped sealing member. For example, exterior surface second segment 42 is configured as seal seating groove 32 which extends around the circumference of valve body 22. The seal seating groove 32 is configured to accommodate seal 30. The seal 30 may be fabricated from any suitable sealing material, such as an elastomeric material, for example. Other materials may also be utilized, such as Teflon® and Hytrel®, taking into consideration that relative compliant nature of material may affect how the material expands to make up the groove and that for some materials, modifications may be necessary such as an open gland, for example, that would accept the different seal material and usage of another component to close the seal groove up.

Figure 7:
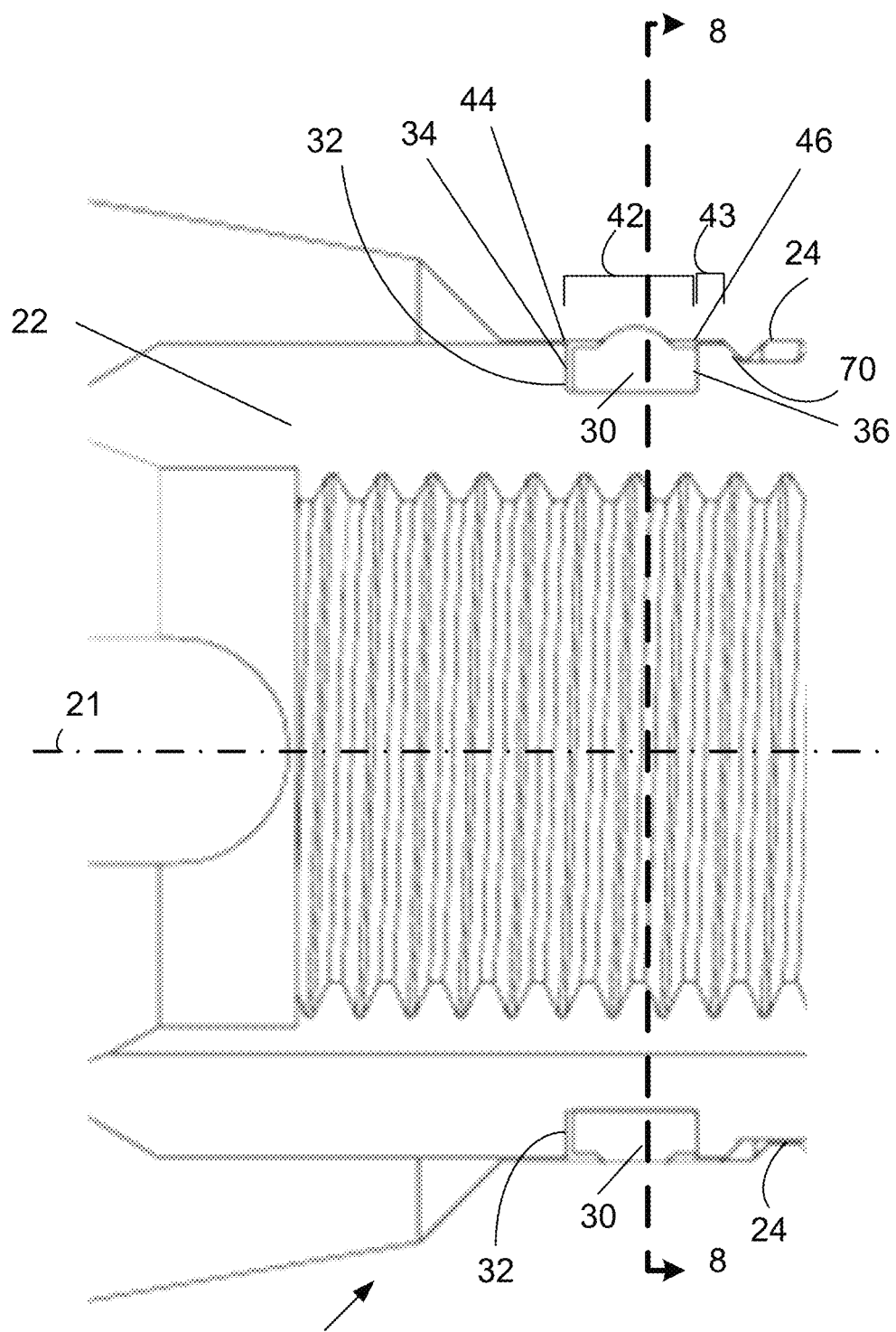
FIG. 7 is a cross sectional enlarged view of a seal structure for either a Back Pressure Valve (BPV) or a Two-Way Check Valve according to an example embodiment and mode.

As shown in more detail in FIG. 7, seal seating groove 32 comprises groove top pressure surface 34 and groove bottom pressure surface 36. The seal seating groove 32 comprises essentially right angle shoulders and at both intersections of the groove 32 with the exterior surface 23. For example, seal seating groove 32 comprises top shoulder 44 at the intersection of groove top pressure surface 34 and exterior surface 23 and bottom shoulder 46 at the intersection of groove bottom pressure surface 36 and exterior surface 23. Both top shoulder 44 and bottom shoulder 46 are essentially ninety degrees. In a radial plane which is perpendicular to the axial direction 21, the groove 32 extends about 0.118 inch. As used herein respecting measurements or dimensions, "essentially", "approximately", or "about" mean plus or minus 5% of the stated numerical value.

As also shown in FIG. 5 and FIG. 7, exterior surface third segment 43 is axially intermediate exterior surface first segment 41 and exterior surface second segment 42. As further shown in FIG. 5 and FIG. 7, the exterior surface third segment 43, in addition to being axially intermediate, is also contiguous with intermediate exterior surface first segment 41 and with exterior surface second segment 42. The exterior surface third segment 43 is configured to be devoid of any helical thread. Preferably exterior surface third segment 43 assumes the shape of a ring in a plane transverse to valve body axis 21. The exterior surface third segment 43 and may herein be referred to as a positive stop ring. The exterior surface third segment 43, e.g., positive stop ring 43, preferably has an essentially smooth circumferential surface which is parallel to the axial direction for the entire axial extent of the third segment 43. When employed herein to describe shape, "essentially" means that 95% or more of the surface or feature is as described by the property to which "essentially" pertains. Thus, the valves of the technology disclosed herein eliminate the trough 138 of the prior art, increasing the lower pressure surface area which provides full support to the seal.

In an example embodiment and mode, the helical thread has a thread pitch of 0.25 inch, in the axial direction the third segment 43 of the exterior surface extends for about 0.10 inch. In a non-limiting, example embodiment and mode, the third segment 43 of the exterior surface extends in the axial direction 21 for a first axial distance and the groove 32 extends for a second axial distance, and ratio of the first axial distance to the second axial distance is about 3.2 to 1, e.g., 3.2:1.0. In a non-limiting, example embodiment and mode, the ratio of the groove radial distance of groove 32 to the groove axial distance is about 2.7 to 1.0. The example embodiments and modes just mentioned are particularly suitable for use with tubing hangers in which a seal land or surface area may be as small as 0.380 inches. The axial first distance, e.g., axial distance of the third segment 43 of the exterior surface extends, may be greater.

Other constituent elements of valve 20, in an example embodiment and mode in which the valve takes the form of a Back Pressure Valve (BPV), are shown in FIG. 5. For example, on its top end the interior cavity 26 of valve body 22 may be provided with interior threads 50, while towards it middle or bottom end the interior cavity 26 of valve body 22 may contain poppet 28. The poppet 28 may comprise a toroidal poppet seal 52. Interior cavity 26 of valve body 22 may also be configured and/or provided with a seal land 54 for sealing engagement with poppet 28 and/or toroidal poppet seal 52. As is known in the poppet art, the poppet 28 may comprise poppet spring 56 and spring guide pin 58.

Figure 2:
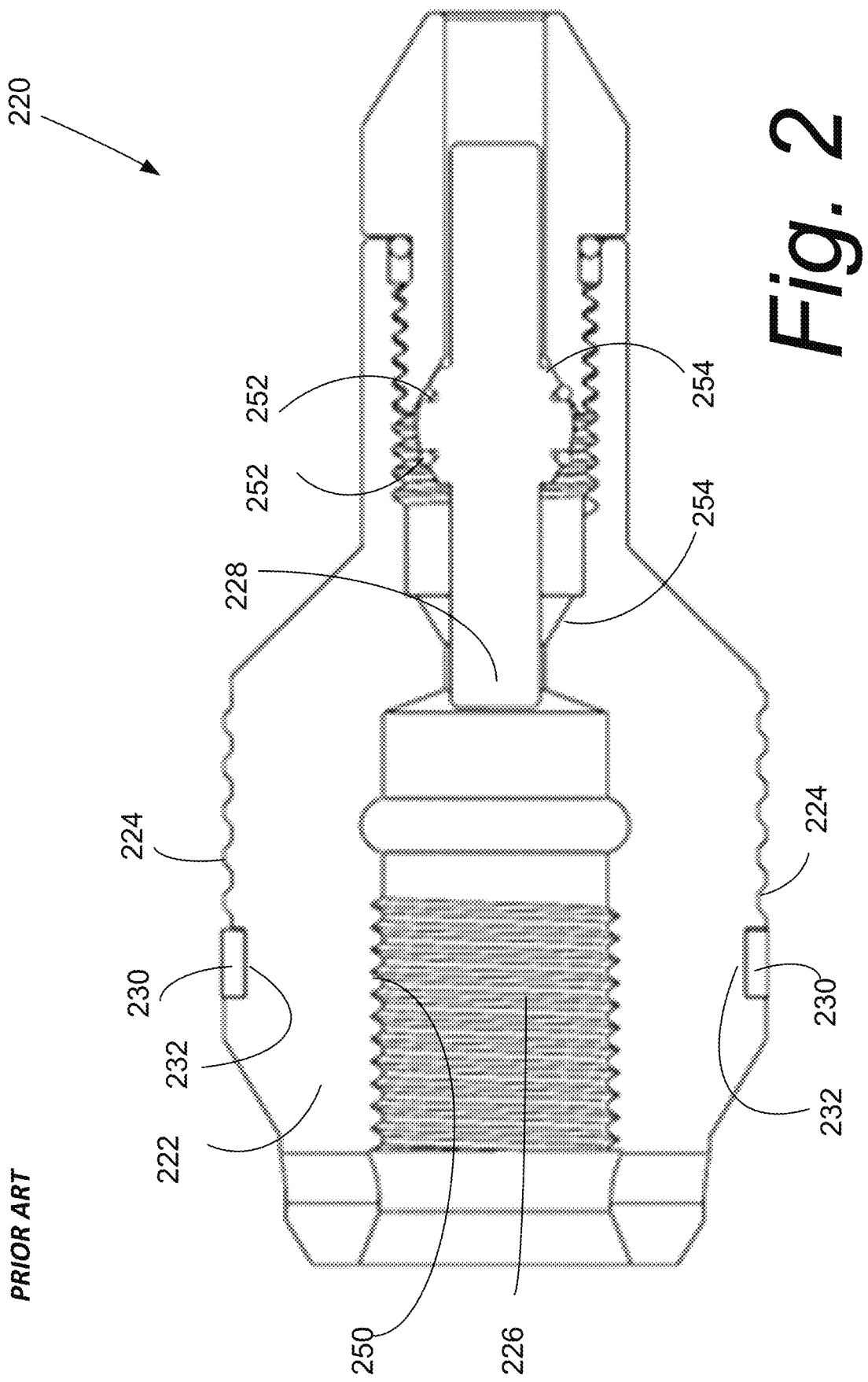
FIG. 2 is a cross sectional view of a prior art Two Way Check Valve (TWCV) for plugging off the tubing in a well from both directions.
Figure 3:
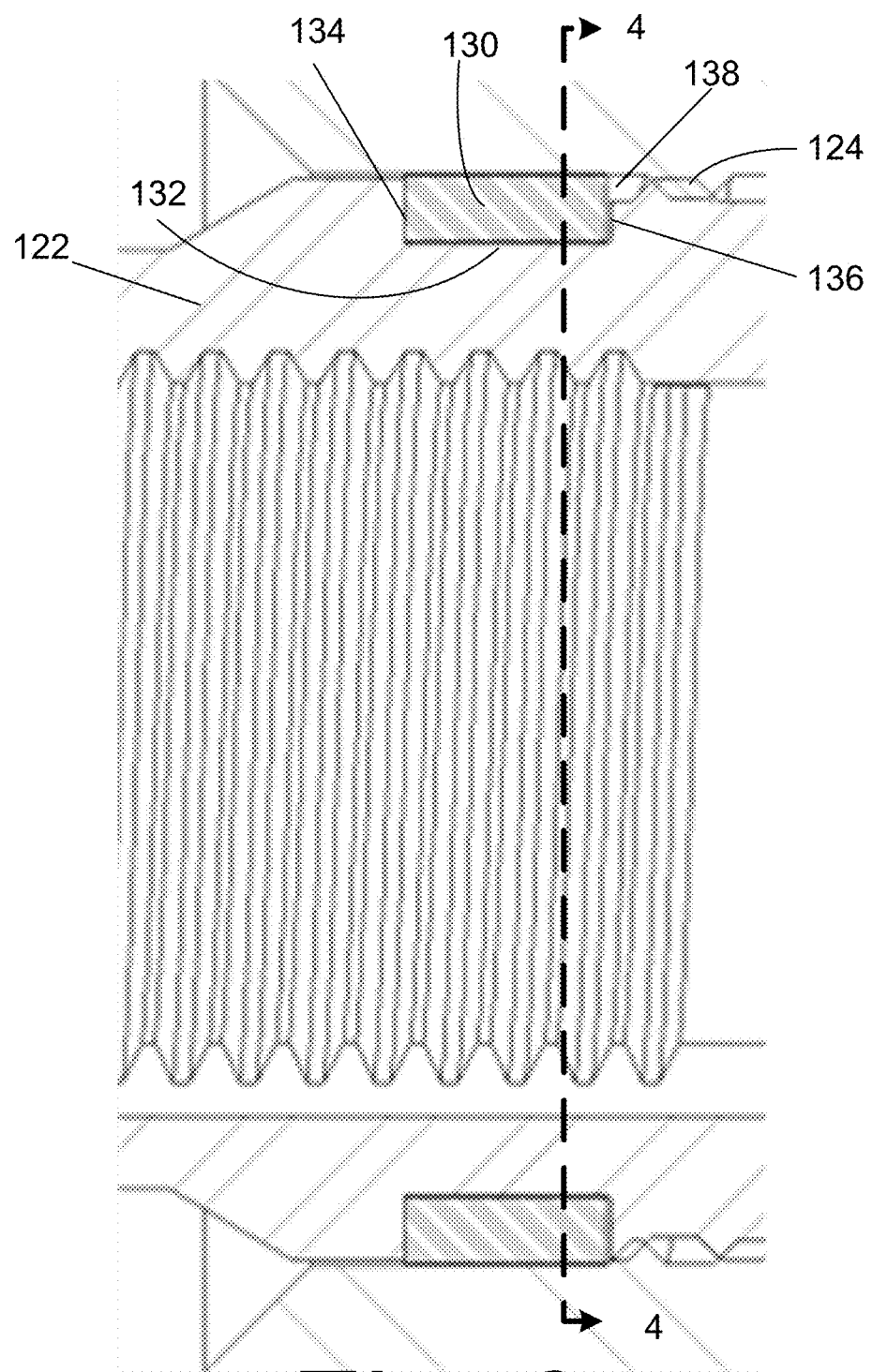
FIG. 3 is a cross sectional enlarged view of prior art seal structure for either a Back Pressure Valve (BPV) of FIG. 1 or a Two-Way Check Valve of FIG. 2.

The valve 20 of FIG. 5 and FIG. 7 has primarily been described as if it were a Back Pressure Valve (BPV). However, as already mentioned above, the valve seal technology of the technology disclosed herein, including but not limited to the exterior surface first segment 41, exterior surface second segment 42, and exterior surface third segment 43, is also applicable to Two-Way Check Valves. To that end, further structure of the Two-Way Check Valve 220 of FIG. 2 is now further mentioned as comprising poppet 228 with poppet seals 252, and poppet seal lands 254.

FIG. 6A and FIG. 6B show how the valves 20 of FIG. 5 and FIG. 7 may be situated in a tubing hanger 60, which in turn is inserted or situated in tubing head 64 of the well. FIG. 6A shows a hanger and valve in a Frac type application; FIG. 6B shows a hanger and valve in a production type application. The tubing hanger 60 does not necessarily seal inside the component bolted on top of it. FIG. 6A further shows tubing head adapter or Christmas tree bottom 66. FIG. 6A also shows the counter-threaded interior surface 68 of the tubing hanger 60, which comprises the threads with which the circumferential exterior threads 24 of exterior surface first segment 41 engage. Although FIG. 6A shows an example situation of a valve in the form of a Back Pressure Valve (BPV) in a tubing hanger 60, it will be appreciated that the situation of a Two-Way Check Valve in a tubing hanger 60 may be similar, depending on application. For example, FIG. 6B shows a Two-Way Check Valve situated in a tubing hanger 60, which again is inserted or situated in tubing head 64 of the well. The situation and installation depends on the particular application.

Normally in a production set up such as shown in FIG. 6B, tubing hanger 60 conveys the production tubing into the well and comprises a load shoulder at its bottom that engages with the hanger load shoulder 80 in the tubing head 64. The tubing hanger seal 84 isolates the area above from pressure migration across the tubing hanger. The extended tubing hanger neck seals 88 serve to seal the Wellhead Tree or Tubing Head adapter when it is landed on the tubing head. This seals the production fluid from exiting and leaking to the environment. Removal of the valve 20 then allows the production fluid or gas to be transmitted to the surface. Thus, in the production application there is a tubing hanging from the tubing hanger which is locked on its landing shoulder by Lockdown Screws. The extended neck of the hanger would then seal off in the bottom of the tubing head adapter or it could seal off on the bottom inner diameter of the wellhead Christmas tree.

By contrast, the Frac type situation, shown by example in FIG. 6A, does not involve a tubing hanging from the tubing hanger but includes a hanger load shoulder 80 that it lands on and is locked in place by lockdown screws 82, similar to those mentioned previously. The hanger load shoulder 80 may also effect a seal at the tubing head adapter corresponding to the load shoulder. FIG. 6B also shows tubing hanger seal 84; production tubing 86; and extended tubing hanger neck seals 88.

The valve 20 of FIG. 5 and FIG. 7, e.g., an improved back pressure valve according to an example embodiment and mode, comprises new features that improve the functionality including improved sealability as well as positive stop ring, e.g., the ring of exterior surface third segment 43, for ease of installation and retrieval for the operator. The features include a modified exterior that includes the positive stop ring 43 and an improved seal carrier groove 32. The seal carrier groove 32 has a closed cross-section having equal pressure surfaces, e.g., groove top pressure surface 34 and groove bottom pressure surface 36. With this improved section, e.g., exterior surface second segment 42 with seal seating groove 32, the seal 30 has more surface area on the lower pressure face 36 than when compared to the lower pressure face 134 of the prior art structure shown in FIG. 4. This ensures the seal remains intact and does not extrude past the metal mating components resulting in a failure to seal at pressures up to 20,000 psi. As mentioned above, the two way check valve comprises the same inventive features as the Back Pressure Valve.

Figure 4:
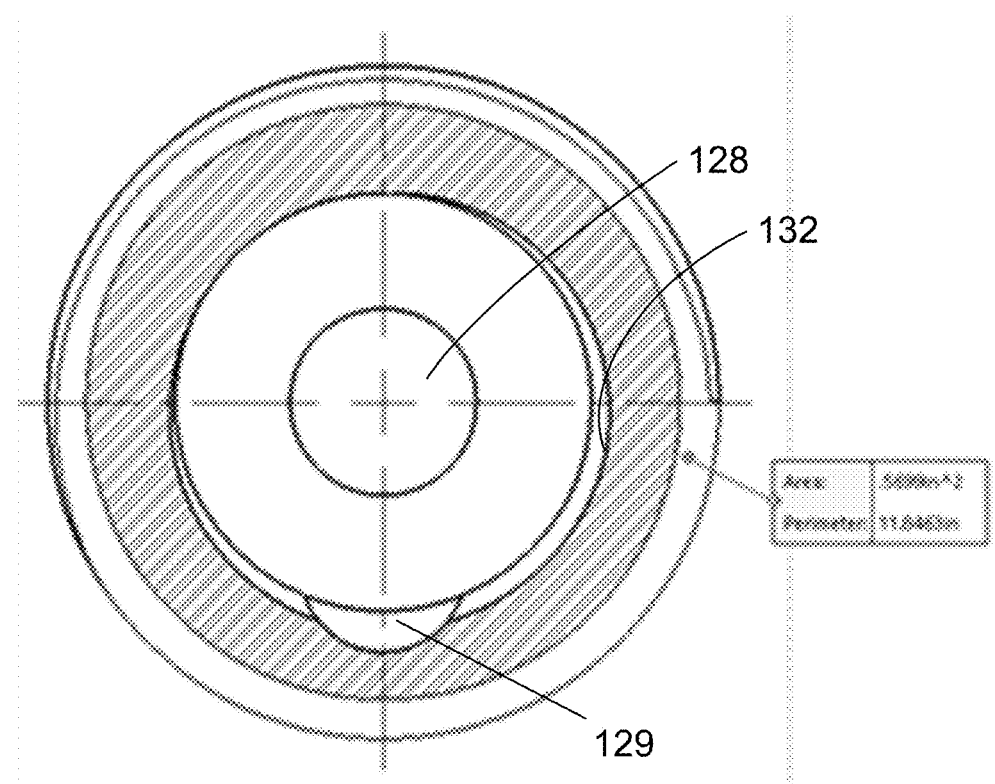
FIG. 4 is a sectioned side view of the structure of FIG. 3 taken along line 4-4.
Figure 8:
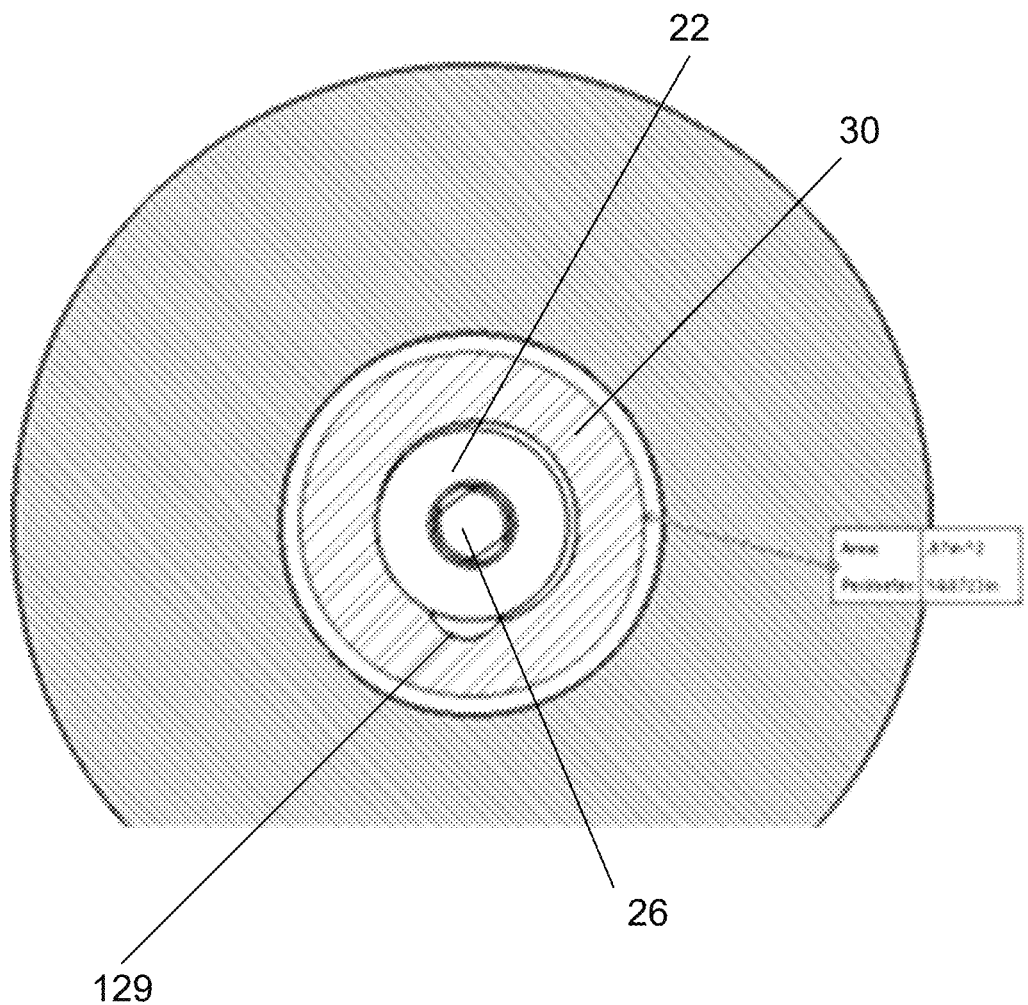
FIG. 8 is a sectioned side view of the structure of FIG. 7 taken along line 8-8.

Comparing FIG. 4 and FIG. 8, it can be seen by this example that the Lower Pressure surface Area 36 of the improved Back Pressure Valve 20 as shown in FIG. 8 is 0.87 in$^2$, whereas the Lower Pressure surface area 136 of the valve of FIG. 4 is 0.5699 in$^2$. This difference equates to approximately 50% lower pressure surface area 36 in the technology disclosed herein, e.g., the structure of FIG. 8, over the prior art of FIG. 4. Therefore, the prior art two way check valve has a smaller lower pressure surface area 136 supporting the seal, thereby increasing the probability for failure. The percentage difference in lower pressure surface areas was calculated for one particular size but will follow the same rules/outcomes for all other sizes in the family.

As shown in FIG. 7, the Positive Stop Ring 43 is machined into the body 22 with a stop ring bottom shoulder 70. The stop ring bottom shoulder 70 is formed at the intersection of exterior surface third segment 43 with exterior first second segment 41. The stop ring bottom shoulder 70 is machined at an angle of 45° to match the 45° flank Angle of the thread machined into the wellhead tubing hanger, e.g., the thread of counter-threaded interior surface 68. Since the positive stop ring feature 43 is machined as a ring that has the same cross-section 360° around the periphery of the body 22 and not machined on a helix angle, the ring 43 will not threadably engage with the thread machined in the tubing hanger 60. Other angles, such as angles greater than or equal to 0° and less than 90°, could be used as the chamfer on the stop ring but may cause damage to the tubing hanger internal thread when the valve 20 is threaded into the tubing hanger 60.

Thus, the technology disclosed herein encompasses an improved well system valve, such as a back pressure valve and/or a two-way check valve, comprising a bore, a valve seat, a poppet biased onto said seat, a seal land, and an external shoulder. The external shoulder comprises a ring machined 360° into the outer surface of the body. The machined ring is not threaded and therefore not threadably engageable with the thread machined into the mating component to which the back pressure valve and two-way check valve are designed to be threaded. The ring structure thus ensures a positive stop and clearly identified stopping position within the well system component for the sealing element.

Thus, in a radial plane which is perpendicular to the axial direction 21 and which forms the intersection of the exterior surface second segment 42 and the exterior surface third segment 43, the exterior surface third segment 43 is threadless. For example, in such radial plane the thread pattern of the exterior surface first segment 41 does not even partially extend into the bottom shoulder 46 of the seal seating groove 32, which occurs at the intersection of exterior surface second segment 42 and the exterior surface third segment 43. That is, no circumferential surface of the exterior surface third segment 43 in such radial plane includes even a portion of the thread pattern of the exterior surface first segment 41. Preferably the entire circumferential surface of the exterior surface third segment 43 is essentially smooth.

In the example embodiments described herein concern valves for use in a hanger body of a well system. The valves may be, for example, a Back Pressure Valve (BPV) or a Two-Way Check Valve (TWCV). In a generic example embodiment and mode, the valve comprises a valve body configured for insertion into the hanger body in an axial direction and comprising an exterior surface. A first segment of the exterior surface is configured with a helical thread to engage a counter-threaded portion of a tubing hanger body. A second segment of the exterior surface is configured as an essentially circumferential groove to accommodate an essentially toroidal sealing member. The valve body further comprises at least one stop member configured to control an extent of the insertion of the valve body into the hanger body and thereby preclude threads of the counter-threaded portion of a tubing hanger body from affecting the essentially toroidal sealing member.

In some example embodiments and modes, the groove comprises essentially right angle shoulders at both intersections of the groove with the exterior surface. A third segment of the exterior surface, in the axial direction, is intermediate the first segment and the second segment. The third segment of the exterior surface comprises at least one stop member configured to control an extent of the insertion of the valve body into the hanger body.

Figure 9:
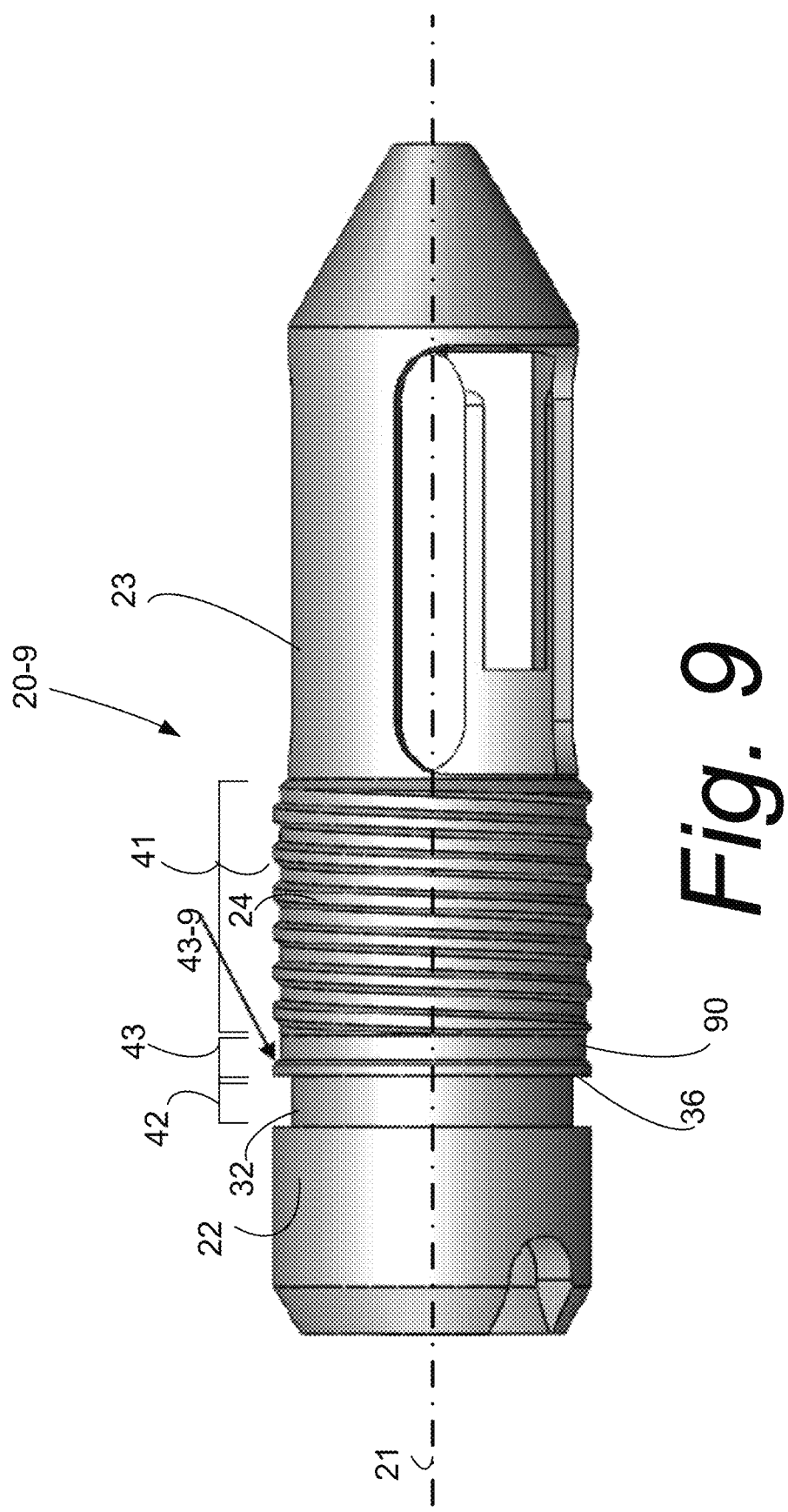
FIG. 9 is a side view of an example embodiment and mode of a valve in which the at least one stop member takes the form of a positive stop ring in conjunction with a thread relief groove.
Figure 10:
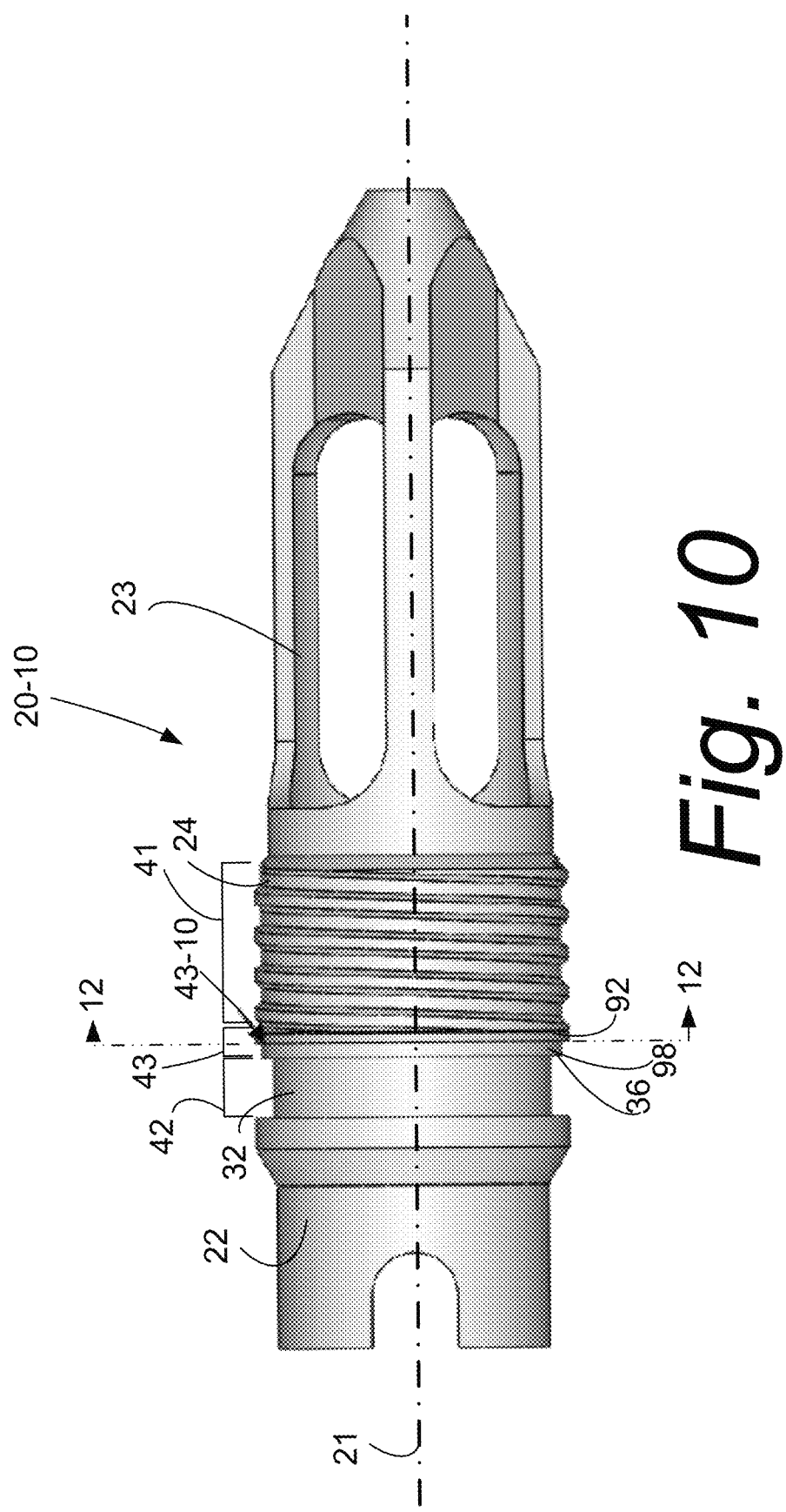
FIG. 10 is a side view of an example embodiment and mode of a valve in which the at least one stop member takes the form of a split ring assembly which resides in a retainer ring groove adjacent a retainer ring groove shoulder.
Figure 11:
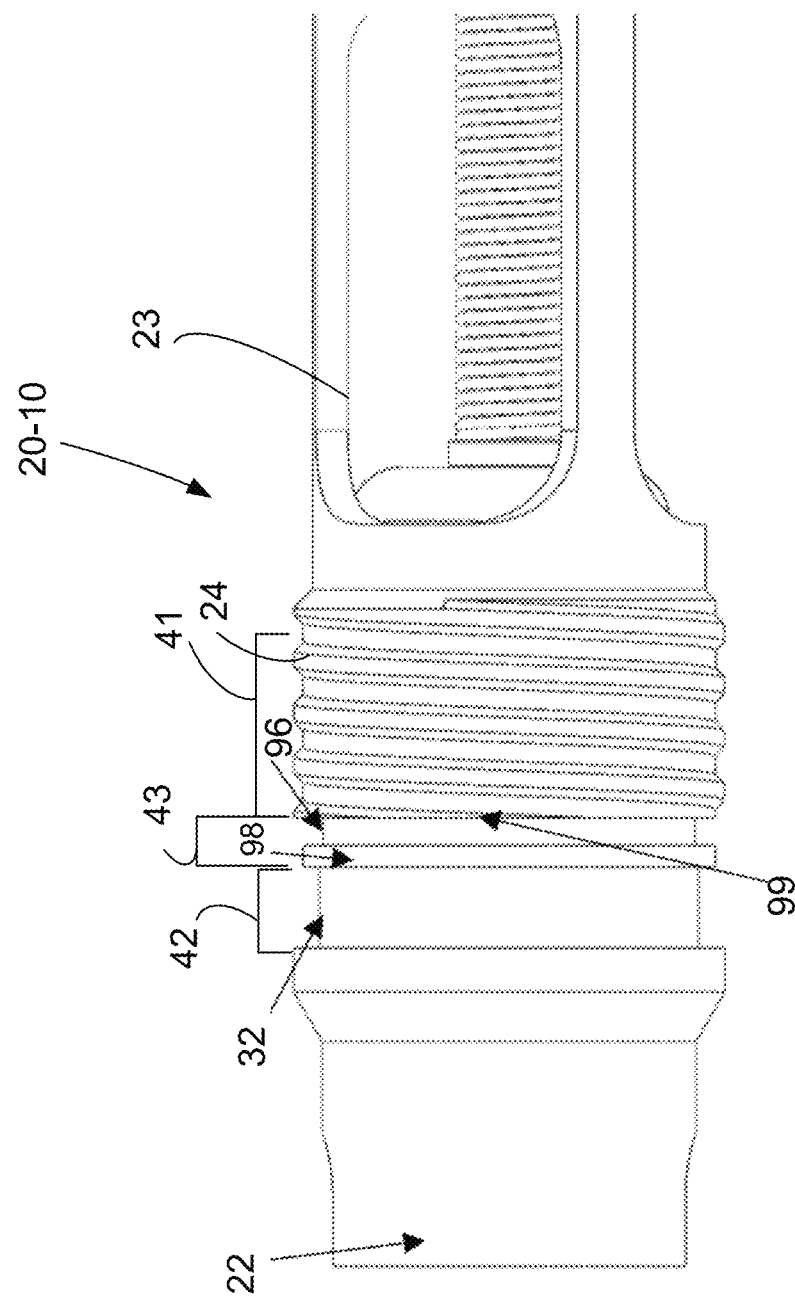
FIG. 11 is a side view of the example embodiment and mode of the valve of FIG. 10 but with the split ring assembly removed for illustration of a second groove.
Figure 12:
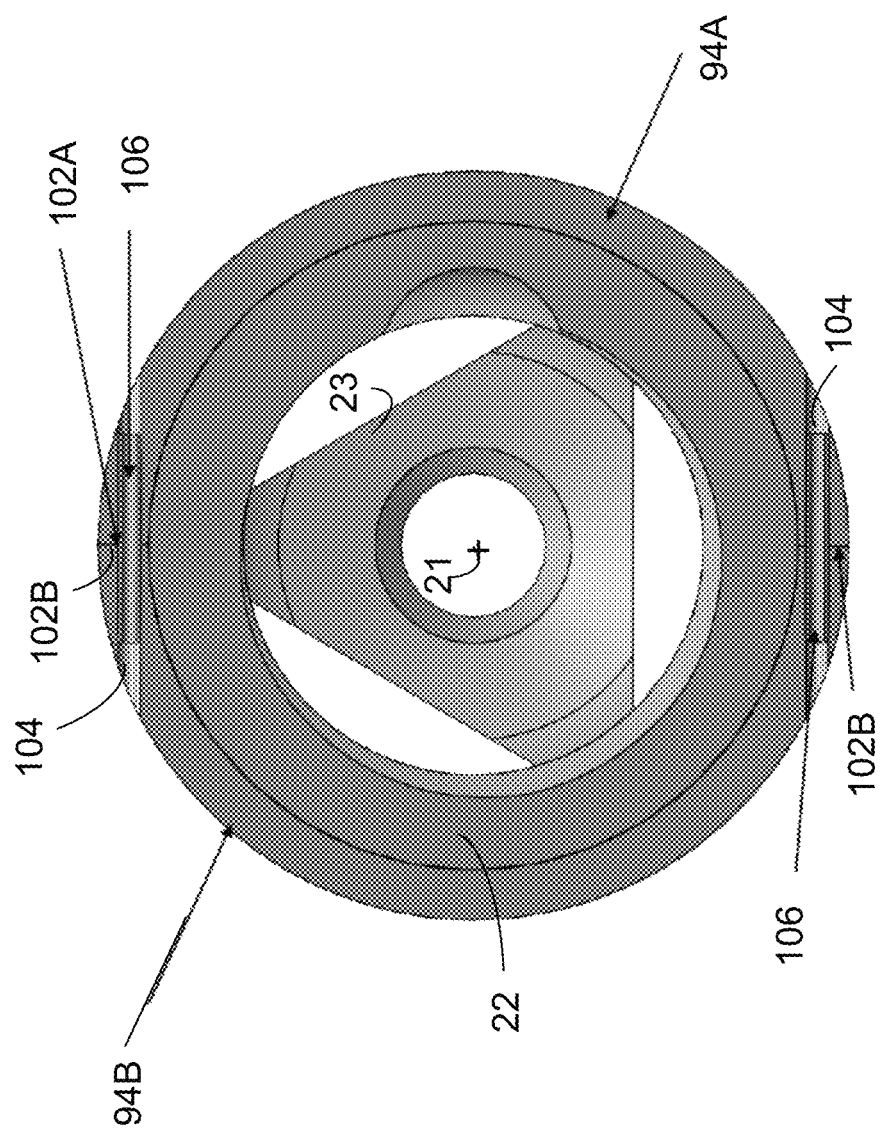
FIG. 12 is a sectioned top view of the valve of the example embodiment and mode of FIG. 10 taken along line 12-12.
Figure 13:
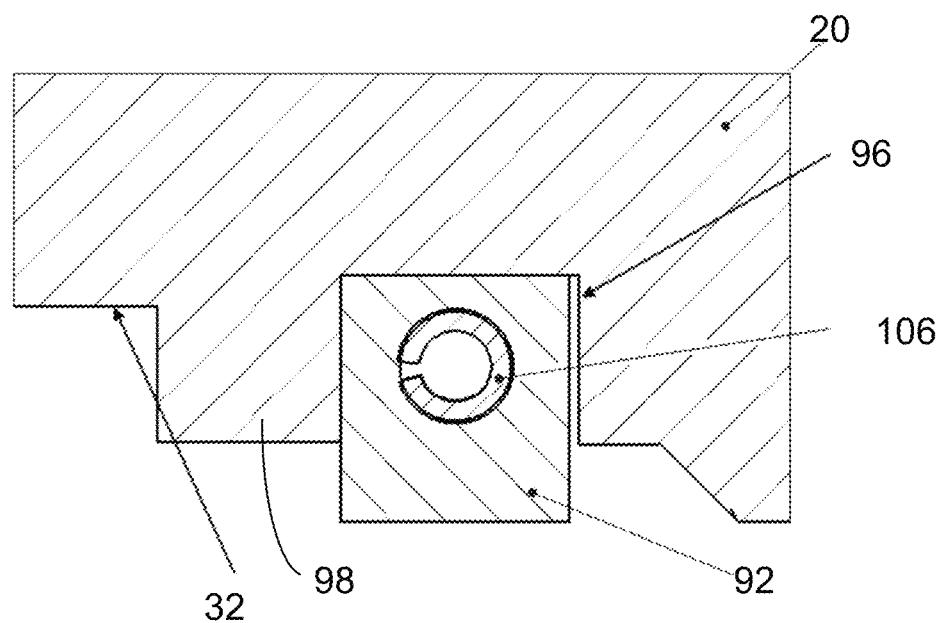
FIG. 13 is an enlarged side-cross sectioned view of the valve of the example embodiment and mode of FIG. 10.
Figure 14:
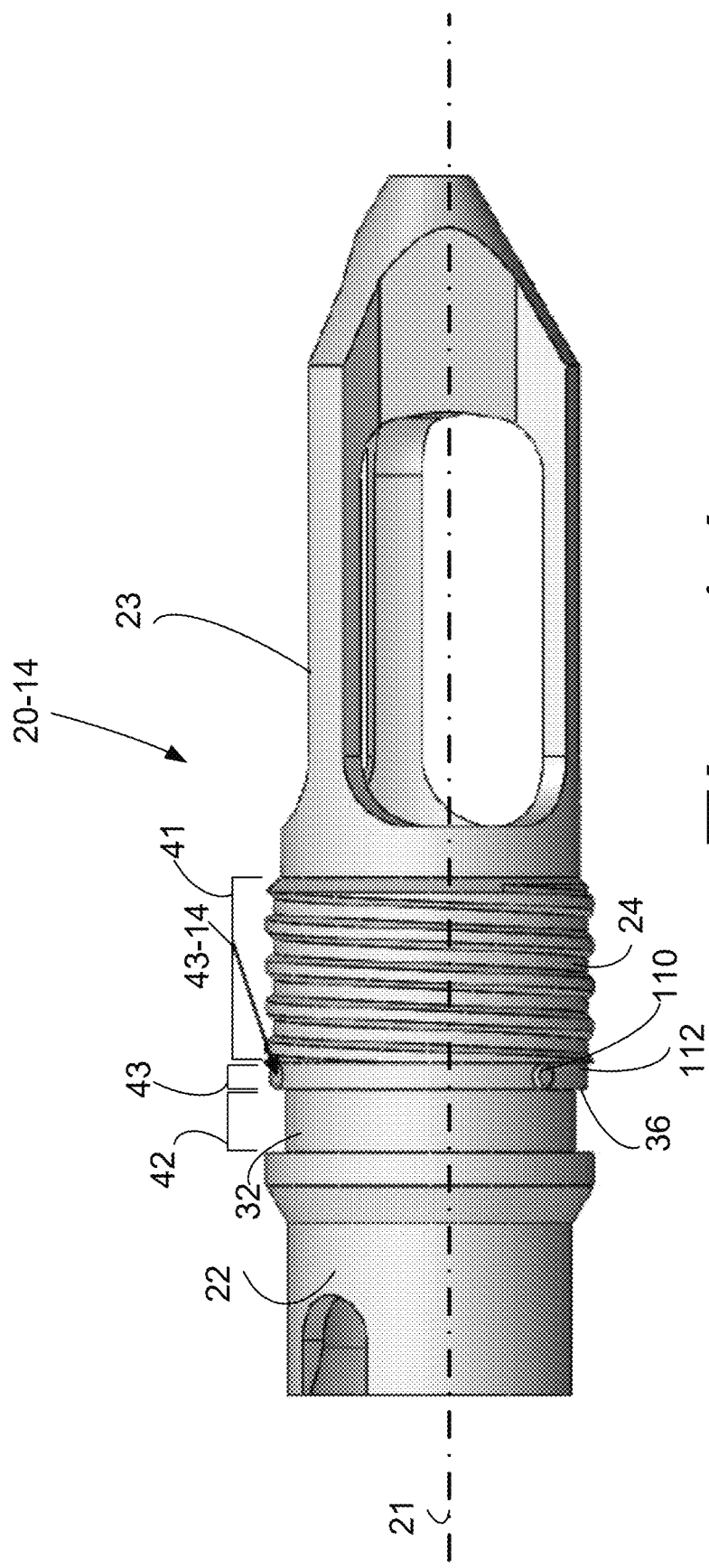
FIG. 14 is a side view of an example embodiment and mode of a valve in which the at least one stop member takes the form of plural discrete and circumferentially arranged stop members configured to control the extent of the insertion of the valve body into the hanger body.

In the example embodiments and modes thus far described, the at least one stop member comprises the positive stop ring 43. Other embodiments described and illustrated herein concern other example embodiments and modes of the at least one stop member. For example, FIG. 9 shows an example embodiment and mode of a valve in which the at least one stop member takes the form of the positive stop ring, also known as an integral shoulder, in conjunction with a thread relief groove; FIG. 10-FIG. 12 show an example embodiment and mode of a valve in which the at least one stop member takes the form of a split ring which resides in a retainer ring groove adjacent a retainer ring groove shoulder; FIG. 14 shows an example embodiment and mode of a valve in which the at least one stop member takes the form of plural discrete and circumferentially arranged stop members configured to control the extent of the insertion of the valve body into the hanger body.

Unless otherwise noted, various elements of the valves of the example embodiments and modes of FIG. 9, FIG. 10, and FIG. 14 are essentially the same as the previously described embodiments and thus have same reference numbers. For example, the valve 20-9 of FIG. 2, the valve 20-10 of FIG. 10, and the valve 20-14 of FIG. 14 may each comprise valve body 22 that extends along valve body axis 21. The valve body 22 comprises valve body exterior surface 23 and interior cavity, similar to interior cavity 26 of FIG. 5, which is configured to accommodate a poppet such as poppet 28 of FIG. 5. As in the example embodiment and mode of FIG. 5, the valve body exterior surface 23 is shown in each of FIG. 9, FIG. 10, and FIG. 14 as comprising at least plural exterior surface segments, including exterior surface first segment 41, exterior surface second segment 42, and exterior surface third segment 43. The valve body exterior surface 23 extends beyond the segments 41, 42, and 43, in both upstream and downstream directions, e.g., to the left and right of segments 41, 42, and 43 in FIG. 9, FIG. 10, and FIG. 14.

As in the preceding embodiments and modes, in the example embodiments and modes of FIG. 9, FIG. 10, and FIG. 14 the exterior surface first segment 41 is configured with an external helical thread 24 to engage a counter-threaded portion of the tubing hanger body, as shown with reference to FIG. 6A and FIG. 6B, for example. The exterior surface second segment 42 is configured as a circumferential groove to accommodate an essentially toroidal-shaped sealing member. For example, exterior surface second segment 42 is configured as seal seating groove 32 which extends around the circumference of valve body 22. The seal seating groove 32 is configured to accommodate seal 30. Seal seating groove 32 comprises groove top pressure surface 34 and groove bottom pressure surface 36. The seal seating groove 32 comprises essentially right angle shoulders and at both intersections of the groove 32 with the exterior surface 23, e.g., top shoulder 44 at the intersection of groove top pressure surface 34 and exterior surface 23 and bottom shoulder 46 at the intersection of groove bottom pressure surface 36 and exterior surface 23. The exterior surface third segment is intermediate the first segment and the second segment in the axial direction. The third segment of the exterior surface comprising at least one stop member configured to control an extent of the insertion of the valve body into the hanger body.

The valves of FIG. 9, FIG. 10, and FIG. 14 may have a few differences relative to the valve body of FIG. 5. For example, the valve body may include a tapered or conical section which is upstream of the seal seating groove 32. Such tapered section may be included in tools or equipment that are expected to travel through equipment to get down to its resting place within the wellbore. Components may have tapered sections at the bottom and top. The other option is that a running tool when made up will have the tapered section on it. Tapering may prevent a tool from getting hung up on anything when bringing the component back out of the well. These differences are inconsequential to the one stop member which is configured to control an extent of the insertion of the valve body into the hanger body.

In the example embodiment and mode of FIG. 9, the third segment 43 of the exterior surface comprises at least one stop member configured to control an extent of the insertion of the valve body into the hanger body and a thread relief groove. The at least one stop member comprises a positive stop ring 43-9 which extends in the radial direction at least as far as crest of the threads 24, and which in the axial direction has at least a portion which is a smooth circumferential surface which is parallel to the axial direction. An upstream edge of the positive stop ring 43-9 may form the groove bottom pressure surface, e.g., may form the shoulder at the intersection of the bottom edge of the groove 32 with the exterior surface of the valve body. The thread relief groove 90 is formed axially between the at least one stop member 43-9 and the helical thread of the first segment 41. A downstream edge of the positive stop ring 43-9 may taper toward the axis and thus toward the thread relief groove 90. Thus, at least a portion of the positive stop ring comprises an essentially smooth circumferential surface which is parallel to the axial direction.

In the example embodiment and mode of FIG. 9, the thread relief groove 90 and the positive stop ring 43-9 serve to control an extent of the insertion of the valve body into the hanger body. In the example embodiment and mode of FIG. 9, upon encountering the positive stop ring 43-9 when the valve 20 is inserted into the tubing hanger body 60, the counter-threads on the tubing hanger body 60 cannot over-travel the threads 24 of the valve body 22 in a manner to contact and potentially deform the seal 30 which is in the seal seating groove 32. That is, the positive stop ring 43-9 prevents the thread from engaging further with the seal groove above it.

In the example embodiment and mode of FIG. 10-FIG. 13, the valve body 22, e.g., the third segment 43 of the exterior surface, the positive stop ring 43-10 comprises a split ring assembly 92 comprising plural split ring segments, such as split ring segments 94 illustrated in FIG. 12. The plural split ring segments 94 are configured for mating together and insertion into an essentially circumferential second groove 96 to form an essentially smooth circumferential surface which is parallel to the axial direction. The second groove 96 is shown in FIG. 11, which shows the valve body 22 of the example embodiment and mode of FIG. 10 before the split ring assembly 92 is applied/secured into the second groove 96. The third segment 43 of the exterior surface may also optionally comprise split ring spacer shoulder 98 formed axially between the second groove 96 and the circumferential groove 32 of the second segment 42. The split ring spacer shoulder 98 preferably has a greater radius than a seat surface of the circumferential groove 32 of the second segment 42. The split ring spacer shoulder 98 may form the groove bottom pressure surface 36. The counter-threaded portion of the tubing hanger 60 may terminate at an edge of the second groove 96.

As shown by way of example in FIG. 12, in an example implementation, the split ring assembly 92 comprises two plural split ring segments 94A and 94B which are configured for insertion into the second groove 96. In other embodiments, more than two split ring segments 94 may be provided.

As shown in FIG. 12, the plural split ring segments 94A and 94B each comprise a plural split ring segment end, such as split ring segment ends 102A and 102B, in which a channel 104 is formed to extend in a direction parallel to a tangent of the split ring assembly when the plural split ring segments are joined together. The split ring assembly 92 may further comprise a connection pin 106 which fits into the channels 104 of two of the plural split ring segments 94 to secure the plural split ring segments 94 in the second groove 96 about the valve body 22. In the particular implementation shown in FIG. 12, the split ring assembly 92 comprises two connection pins 106 which respectively fit into the two channels 104 of the two of the plural split ring segments 94A, 94B to secure the two of the plural split ring segments 94A, 94B in the second groove 96 about the valve body 22.

In an example embodiment and mode, the split ring assembly 92 may be manufactured as a disc which then has the pin holes/channels 104 machined in it then it is split into the split ring segments 94. After splitting it is put back together and the final dimensions are machined OD and ID to obtain as near a perfect ring as possible. The rings, e.g., split ring segments 94, are disassembled by removing the pins or undoing screws (if used) placing the 2 halves, e.g., the split ring segments 94, around the groove 96 then refitting the pins or screws 106 which result in keeping the ring of the split ring assembly 92 in place. Thus, the split ring assembly 92 may be wrapped around its retaining groove, e.g., second groove 96, and then pinned in place. The groove 96 that the split ring assembly 92 fits in will allow some movement but only a few thousandths of an inch.

In the example embodiment and mode of FIG. 10-FIG. 13, upon encountering split ring assembly 92 when the valve 20 is inserted into the tubing hanger body 60, the counter-threads on the tubing hanger body 60 cannot over-travel the threads 24 of the valve body 22 in a manner to contact and potentially deform the seal 30 which is in the seal seating groove 32.

In the example embodiment and mode of FIG. 14, the third segment 43-14 of the exterior surface of valve body 22 comprises plural discrete stop members 110 which are circumferentially arranged on the valve body 22 and configured to control the extent of the insertion of the valve body into the hanger body. In an example implementation, the third segment 43-14 of the exterior surface may optionally further comprise a stop member support ring 112 upon which the plural discrete stop members 110 are configured in the axial direction. Preferably the stop member support ring 112 has a greater radius than a seat surface of the essentially circumferential groove 32 of the second segment 42.

In an example implementation, the plural discrete stop members 110 are optionally configured in the axial direction to have a greater extent than a pitch of the helical thread 42 and thereby to control the extension of the insertion of the valve body into the hanger body.

In an example implementation, the plural discrete stop members 110 are optionally configured in the radial direction to have at least as great an extent as the crest of the helical thread 42 and thereby to control the extension of the insertion of the valve body into the hanger body. Although the pin does not need to extend beyond the outside diameter of the thread, the width of the pin may be such that it is greater than the width of the thread profile, which thereby prevents the pin and the valve 20 from advancing into the counter thread of the tubing hanger 60.

In an example implementation, the plural discrete stop members 110 may have the cross-sectional shape of a circle in the axial direction. For example, the plural discrete stop members 110 may be pins. In other example implementations, the plural discrete stop members 110 may have other cross-sectional shapes, such as rectangular, pentagonal, hexagonal, for example, or any other type of suitable protuberance which projects radially in a manner to stop insertion of the valve 20 into the tubing hanger 60.

In an example implementation, the plural discrete stop members 110 may be press fit into the valve body, e.g., may be press fit into the stop member support ring 112 in embodiments in which the stop member support ring 112 is provided. If the stop member support ring 112 is not provided, the plural discrete stop members 110 may be press fit into the valve body 22. The plural discrete stop members 110 may be connected to the valve body 22 by techniques other than press fitting, such as by threading/screwing into the valve body 22, welding, brazing, adhesive/gluing, or riveting, for example.

Figure 15:
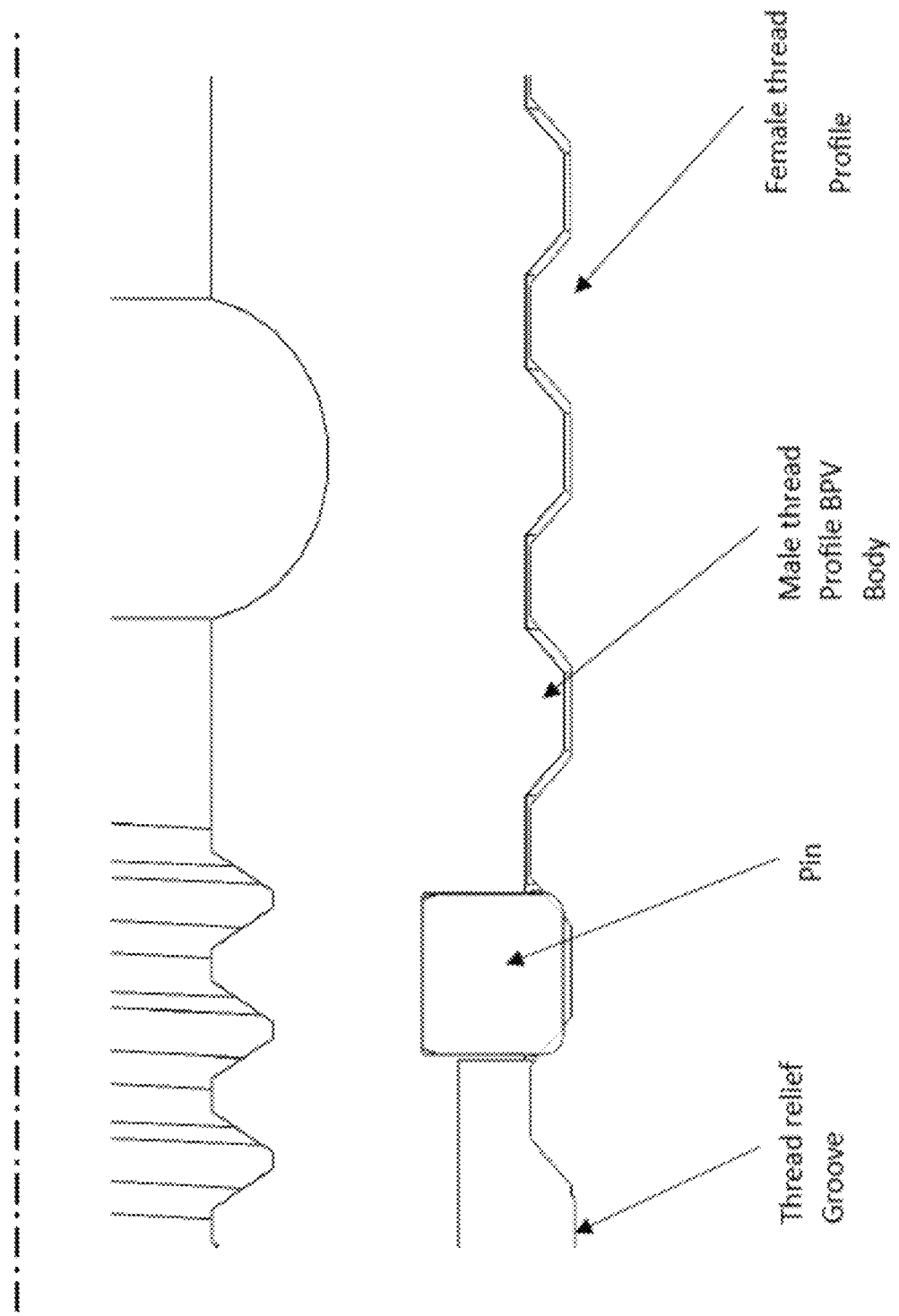
FIG. 15 is a diagrammatic partial side view illustrating how the stop members of the example embodiment and mode of FIG. 14 control the extent of the insertion of the valve body into the hanger body.

In the example embodiment and mode of FIG. 14, upon encountering the plural discrete stop members 110 when the valve 20 is inserted into the tubing hanger body 60, the counter-threads on the tubing hanger body 60 cannot over-travel the threads 24 of the valve body 22 in a manner to contact and potentially deform the seal 30 which is in the seal seating groove 32. FIG. 15 illustrates how the stop members 110 of the example embodiment and mode of FIG. 14 control the extent of the insertion of the valve body into the hanger body. The plural discrete stop members are designed in a way that they prevent the two members from being over threaded with each other. This can be achieved by have the pin diameter greater than the thread pitch diameter or having the stop member protrude beyond the major diameter of the tubing hanger thread, e.g., by >=0.001".

As mentioned above, in an example non-exclusive implementation the diameter of the plural discrete stop members 110 is greater than the pitch of root of the thread 24 and of the counter-threads of tubing hanger 60, so the tubing hanger 60 will not pass the plural discrete stop members 110. For example, in a non-limiting implementation the axial length of the plural discrete stop members 110 may be about 0.16 inch, while the pitch of the thread 24 and the diameter of the stop member may be greater than about 0.25 inch.

Figure 16:
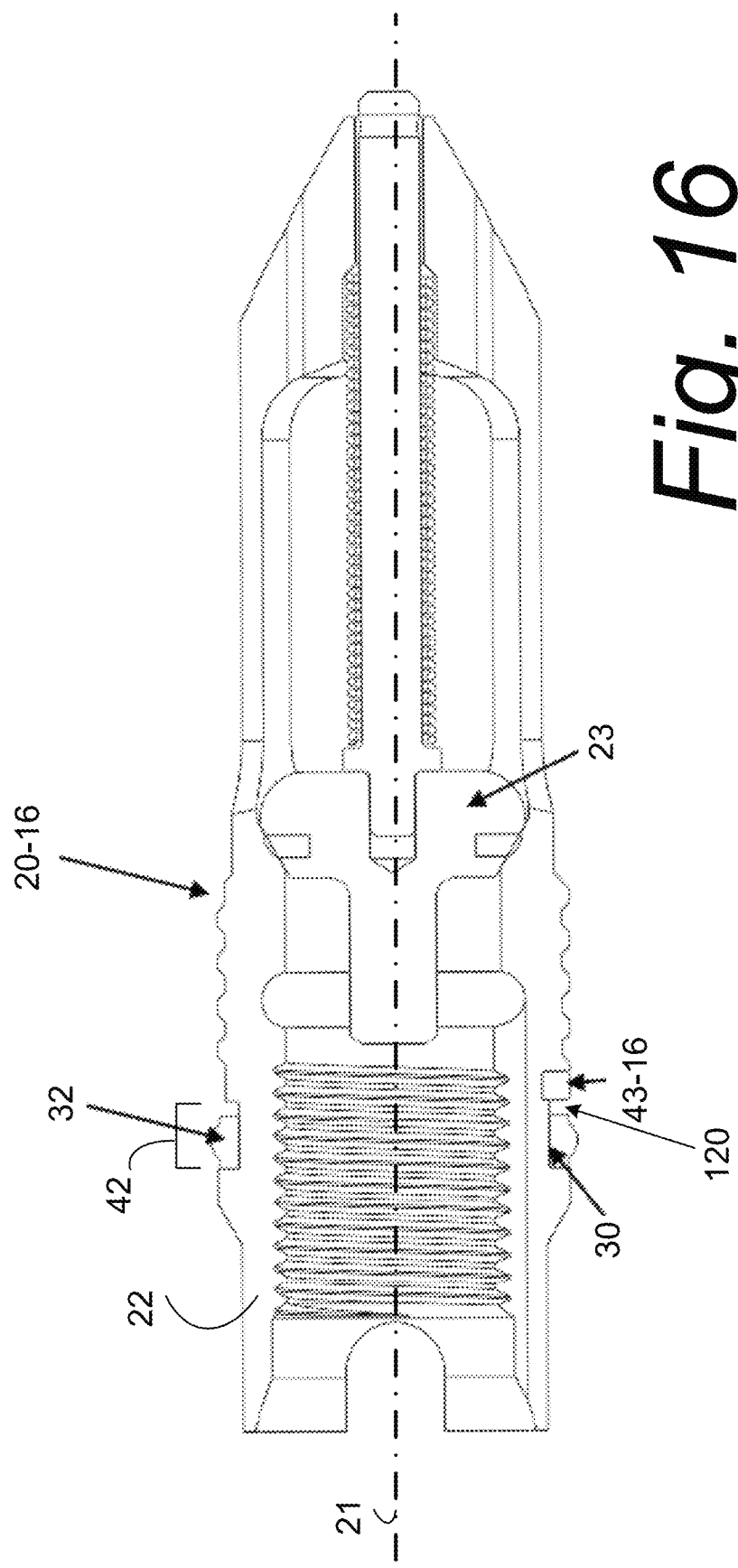
FIG. 16 is a sectioned side view of an example embodiment and mode of a valve in which at least one stop member is situated at least partially in a seal seating groove which also serves to accommodate the seal.

In some example embodiments and modes, such as the example non-exclusive embodiment and mode illustrated in FIG. 16, the at least one stop member 43-16 of the valve is situated at least partially in the seal seating groove 32 which also serves to accommodate the seal 30. The seal seating groove 32 is also known as the circumferential groove of the second segment.

In the preceding example embodiments and modes, the seal groove, e.g., seal seating groove 32, is longer than the seal 30 itself in accordance with known practices. A reason for this is that for this design of seal to work efficiently approximately 10% of the gland must be void space, e.g., gland volume is 1.1× seal volume. Having the seal seating groove 32 longer in the axial direction leaves room for the seal to swell or expand due to temperature and contact with chemicals ensuring the seal maintains sealing integrity at all times. By contrast, in the example embodiment and mode of FIG. 16 the seal seating groove 32 is more than 10% longer in the axial direction 21 than the seal 30, in order to provide space in the seal seating groove 32 for at least a portion of the stop member 43-16. For example, in the example embodiment and mode of FIG. 16, the seal seating groove 32 may be longer in the axial direction 21 than the seal 30 by a range of 25% to 30%.

In the example embodiment and mode of FIG. 16, the seal seating groove 32 is sufficiently long in the axial direction 21 so that the stop member 43-16 may be rooted, secured, or fit adjacent to or even form the groove bottom pressure surface 36, and also to provide room in the seal seating groove 32 for the seal 30 and reasonable expansion thereof. FIG. 16 shows a small gap 120 between the stop member 43-16 and the seal 30, the size of the gap being sufficient to allow the expansion of seal 30. Thus, in the example embodiment and mode of FIG. 16, the stop member 43-16 is provided between the first segment 41, e.g., the threads 24 on valve 20-16, and the essentially toroidal sealing member, e.g., seal 30.

FIG. 16 particularly illustrates an example implementation in which the stop member 43-16 comprises plural discrete stop members which are circumferentially arranged on the valve body in the seal seating groove 32, e.g., plural discrete stop members of the type of plural discrete stop members 110 as shown in FIG. 14. For this reason, and since it is shown in cross-section, FIG. 16 shows only one stop member 43-16, it being understood that at least one other stop member 43-16 may be provided but not necessarily symmetrically about the axis 21.

In an alternate example implementation, the stop member 43-16 may comprise a split ring assembly comprising plural split ring segments such as shown in and understood by the embodiment of FIGS. 11-12. As in the example embodiment of FIGS. 11-12, the plural split ring segments may be configured for mating together and insertion into the circumferential grove, e.g., seal seating groove 32, to form an essentially smooth circumferential surface which is parallel to the axial direction. In such split ring assembly implementation, the stop member 43-16 would preferably extend entirely around the valve body 22 but at least partially within the seal seating groove 32.

In any one or more of the example embodiments and modes described herein, the valve may be any well-appropriate valve, such as a back pressure valve or a two way check valve.

Figure 17:
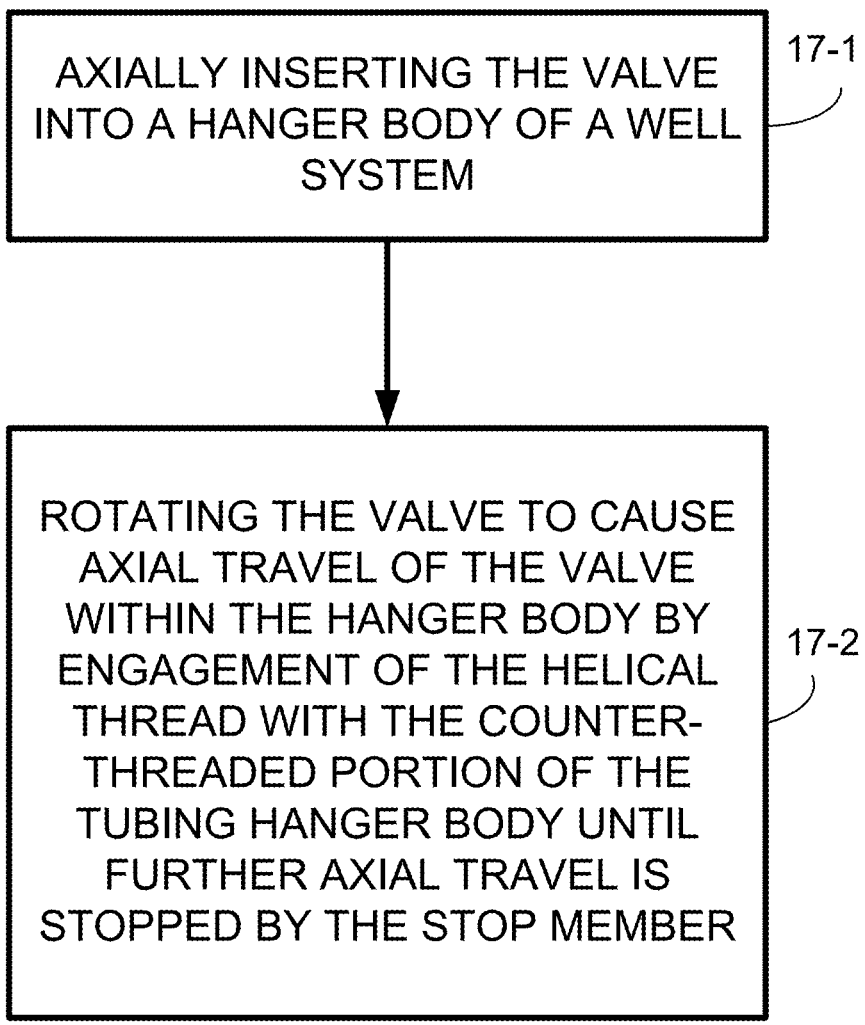
FIG. 17 shows example, basic, representative acts or steps comprising an example embodiment and mode of a method of inserting a valve into a hanger body of a well system.

FIG. 17 shows example, basic, representative acts or steps comprising an example embodiment and mode of a method of inserting a valve such as valve 20, into a hanger body of a well system. Act 17-1 comprises axially inserting the valve 20, described in example embodiments and modes herein, into a hanger body of a well system. For example, the valve 20 is inserted from the left side of FIG. 6 into the structure of FIG. 6. As example context and optional detail for act 17-1, the valve 20 may be inserted by lowering the valve into the hanger body using a Parmalee wrench until the valve 20 contacts the threads in the tubing hanger.

Act 17-2 comprises rotating the valve 20 to cause axial travel of the valve within the hanger body by engagement of a helical thread of the valve with the counter-threaded portion of the tubing hanger body until further axial travel is stopped by at least one stop member configured to control an extent of the insertion of the valve body into the hanger body. Stopping of the axial travel of the valve by the at least one stop member preclude threads of the counter-threaded portion of a tubing hanger body from affecting the essentially toroidal sealing member, e.g., functionally and/or structurally, e.g., so that the seal 30 is not deformed. As described in some of the example embodiments described herein, the at least one stop member comprises the third segment of the exterior surface of the valve. For example, in the embodiment of FIG. 5 and FIG. 7, the stop member comprises a helically threadless segment of the exterior surface of the valve body, e.g., e.g., by exterior surface third segment 43, also known herein as the positive stop ring 43. In other embodiments, the at least one stop ring for the method of FIG. 17 may be realized by the stop member 43-9 and thread relief grove 90 of FIG. 9, by split ring assembly 92/43-11 of FIG. 10, by the plural discrete stop members 110/43-14 of FIG. 14, or by the stop member(s) which are provided in the seal seating groove 32 in the manner of FIG. 16.

As example context and optional detail for act 17-2, when the valve 20 is at the correct depth the Parmalee Wrench is pulled downward and rotated counterclockwise at the same time. Depending on geometry, the valve 20 should come to a stop at approximately 5-½ to 6 turns. Unlike the prior art, there is no need or structural opportunity to attempt to apply further torque, since the hard stop afforded by the stop member 43 provides the assurance that the seal is correctly seated in the seal diameter of the hanger. No torque is required to effect a seal, with the advantage that the seal may not be prematurely cut during installation as in the case of the prior art.

In the prior art method it was necessary for an operator to mark the rod that is used to deliver the valve to its destination, then count the number of turns applied to the valve, and then, when there is resistance, to apply a torque. The applied torque was not measured or applied using a torque tool, but rather the operator relied on operator experience to know when the valve is set in the correct place. By contrast, in accordance with one aspect of the technology disclosed herein as exemplified by the method of FIG. 17, a distinct stop is provided so that no torque need be applied since the new seal is self-energized when it engages with the sealing surface in the tubing hanger. Thus, the method of FIG. 17 and seal structure of the technology disclosed herein take the uncertainty out of the setting/installation process.

Thus, the technology disclosed herein has many beneficial aspects and advantages.

In one of its example aspects the technology disclosed herein relates to a device for plugging off and controlling an oil and gas type well as one example.

In another of its example aspects the technology disclosed herein relates to a device for plugging off and enabling pressure testing of the connection when new equipment has been installed above the tubing hanger.

In yet another of its example aspects the technology disclosed herein relates to a device that, when run, positively stops in the optimum position in the tubing hanger to ensure effective sealing every time.

In still another of its example aspects the technology disclosed herein relates to the upgrading of the sealing system by providing a proprietary seal design and groove.

In at least some of its example aspects, the technology disclosed herein eliminates the disadvantages by taking the guesswork out of running the valves and the seal seating process making it easier, for those new to running this type of equipment, to install it correctly first time every time. In at least some example embodiments and modes this is achieved by including a 360° ring with a chamfer angle machined into it matching the flank angle of the thread and having a seal and gland that is suitably spaced out from the positive stop ring.

In another of its example aspects the seal groove of example embodiments and modes provides a ring feature that is strategically spaced out from the end of the seal groove and positively stops a valve, such as a Back Pressure Valve (BPV) or a Two-Way Check Valve, from being over threaded into the tubing hanger.

The scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A valve for use in a hanger body of a well system, the valve comprising:
 a valve body, the valve body configured for insertion into the hanger body in an axial direction and comprising an exterior surface;
 a first segment of the exterior surface being configured with a helical thread to engage a counter-threaded portion of a tubing hanger body;
 a second segment of the exterior surface being configured as an essentially circumferential groove to accommodate an essentially toroidal sealing member;
 plural discrete stop members circumferentially arranged on the valve body and configured to control an extent of the insertion of the valve body into the hanger body and thereby preclude threads of the counter-threaded portion of a tubing hanger body from affecting the essentially toroidal sealing member.

2. The valve of claim 1, wherein the plural discrete stop members are configured in the axial direction to have a greater extent than a pitch of the helical thread and thereby to control the extension of the insertion of the valve body into the hanger body.

3. The valve of claim 1, further comprising a stop member support ring upon which the plural discrete stop members are configured in the axial direction, the stop member support ring having a greater radius than a seat surface of the essentially circumferential groove of the second segment.

4. The valve of claim 1, wherein the plural discrete and circumferentially arranged stop members are press fit into the valve body.

5. The valve of claim 1, wherein the plural discrete and circumferentially arranged stop members are pins.

6. The valve of claim 1, wherein the valve is a back pressure valve.

7. The valve of claim 1, wherein the valve is a two way check valve.

8. The valve of claim 1, wherein the plural discrete stop members are configured in the radial direction to have at least as great an extent as the crest of the helical thread plural discrete stop members intermediate the first segment and the second segment in the axial direction.

9. The valve of claim 1, wherein the plural discrete stop members are intermediate the first segment and the second segment in the axial direction.

10. A valve for use in a hanger body of a well system, the valve comprising:
a valve body, the valve body configured for insertion into the hanger body in an axial direction and comprising an exterior surface;
a first segment of the exterior surface being configured with a helical thread to engage a counter-threaded portion of a tubing hanger body;
a second segment of the exterior surface being configured as an essentially circumferential groove to accommodate an essentially toroidal sealing member;
at least one stop member comprising
a split ring assembly, the split ring assembly comprising plural split ring segments, the plural split ring segments being configured for mating together and insertion on the valve body to form an essentially smooth circumferential surface which is parallel to the axial direction and configured to control an extent of the insertion of the valve body into the hanger body and thereby preclude threads of the counter-threaded portion of a tubing hanger body from affecting the essentially toroidal sealing member.

11. The valve of claim 10, wherein the split ring assembly comprises two plural split ring segments which are configured for insertion into a essentially circumferential second groove provided on a third segment of the exterior surface, the third segment of the exterior surface being intermediate the first segment of the exterior surface and the second segment of the exterior surface.

12. The valve of claim 11, wherein the third segment of the exterior surface comprises a split ring spacer shoulder formed axially between the second groove and the circumferential groove of the second segment, the split ring spacer shoulder having a greater radius than a seat surface of the circumferential groove of the second segment.

13. The valve of claim 10, wherein the plural split ring segments each comprise a plural split ring segment end in which a channel is formed to extend in a direction parallel to a tangent of the split ring assembly when the plural split ring segments are joined together, and wherein the split ring assembly further comprises a connection pin which fits into the channels of two of the plural split ring segments to secure the plural split ring segments in the second groove about the valve body.

14. The valve of claim 13, wherein the plural split ring segments each comprise plural split ring segment ends, each plural split ring segment end of the plural split ring segments having a channel formed therein to extend in the direction parallel to the tangent of the split ring assembly when the two of the plural split ring segments are joined together, and wherein the split ring assembly further comprises two connection pins which respectively fit into the two channels of the two of the plural split ring segments to secure the two of the plural split ring segments in the second groove about the valve body.

15. The valve of claim 10, wherein the at least one stop member is situated in the circumferential groove of the second segment and between the first segment and the essentially toroidal sealing member.

16. The valve of claim 15, wherein the plural discrete stop members are circumferentially arranged on the valve body in the circumferential groove of the second segment.

17. A method of inserting a valve into a hanger body of a well system, the method comprising:
axially inserting a valve into the hanger body of a well system,
rotating the valve to cause axial travel of the valve within the hanger body by engagement of a helical thread of the valve with a counter-threaded portion of the tubing hanger body until further axial travel is stopped by plural discrete and circumferentially arranged stop members which are configured in the axial direction to have a greater extent than a pitch of the helical thread and thereby to control the extension of the insertion of the valve body into the hanger body.

18. The method of claim 17, wherein the plural discrete and circumferentially arranged stop members are configured in the axial direction to have a greater extent than a pitch of the helical thread and thereby to control the extension of the insertion of the valve body into the hanger body.

19. The method of claim 18, wherein the plural discrete and circumferentially arranged stop members are press fit into the valve body.

20. The method of claim 18, wherein the plural discrete and circumferentially arranged stop members are pins.

21. The method of claim 17, wherein the plural discrete stop members are configured in the radial direction to have at least as great an extent as the crest of the helical thread.

22. The method of claim 17, wherein the plural discrete stop members are intermediate the first segment and the second segment in the axial direction.

23. The method of claim 17, wherein the plural discrete stop members are circumferentially arranged on the valve body in the circumferential groove of the second segment.

24. A method of inserting a valve into a hanger body of a well system, the method comprising:
axially inserting a valve into the hanger body of a well system,
rotating the valve to cause axial travel of the valve within the hanger body by engagement of a helical thread of the valve with a counter-threaded portion of the tubing hanger body until further axial travel is stopped by
rotating the valve to cause the axial travel of the valve within the hanger body by engagement of a helical thread of the valve with a counter-threaded portion of the tubing hanger body until further axial travel is stopped by a split ring assembly inserted into a circumferential groove of the valve body.

25. The method of claim 24, wherein the spit ring assembly is configured in the axial direction to have a greater extent than a pitch of the helical thread and thereby to control the extension of the insertion of the valve body into the hanger body.

26. The method of claim 24, wherein the split ring assembly is intermediate the first segment and the second segment in the axial direction.

27. The method of claim 24, wherein the split ring assembly is circumferentially arranged on the valve body in the circumferential groove of the second segment.

\* \* \* \* \*